(12) United States Patent
Dean et al.

(10) Patent No.: US 9,764,539 B2
(45) Date of Patent: Sep. 19, 2017

(54) FORMING METHOD FOR A HONEYCOMB STRUCTURE

(71) Applicant: The Boeing Company, Chicago, IL (US)

(72) Inventors: Thomas Andrew Dean, Maple Valley, WA (US); Brenda Catherine Benedetti, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 85 days.

(21) Appl. No.: 14/981,768

(22) Filed: Dec. 28, 2015

(65) Prior Publication Data

US 2016/0193819 A1    Jul. 7, 2016

Related U.S. Application Data

(60) Division of application No. 13/588,826, filed on Aug. 17, 2012, now Pat. No. 9,221,230, which is a continuation-in-part of application No. 13/214,848, filed on Aug. 22, 2011, now Pat. No. 8,481,143.

(51) Int. Cl.
| | |
|---|---|
| *B21D 47/00* | (2006.01) |
| *B32B 37/14* | (2006.01) |
| *B29D 24/00* | (2006.01) |
| *B32B 3/12* | (2006.01) |
| *B29D 99/00* | (2010.01) |

(52) U.S. Cl.
CPC ............ *B32B 37/146* (2013.01); *B21D 47/00* (2013.01); *B29D 24/005* (2013.01); *B29D 99/0089* (2013.01); *B32B 3/12* (2013.01); *Y10T 156/1036* (2015.01); *Y10T 428/24149* (2015.01)

(58) Field of Classification Search
CPC .............. Y10T 156/1051; B21D 47/00; B29D 99/0089
USPC ......................................................... 428/116
See application file for complete search history.

(56) References Cited

U.S. PATENT DOCUMENTS

| | | |
|---|---|---|
| 2,668,327 A | 2/1954 | Steele |
| 2,704,587 A | 3/1955 | Pajak |
| 3,086,624 A | 4/1963 | Wyatt |
| 3,196,533 A | 7/1965 | Ida et al. |
| 3,212,189 A | 10/1965 | Savit |
| 3,460,233 A | 8/1969 | Pfaffenberger et al. |
| 3,616,141 A | 10/1971 | Anderson |
| 4,076,880 A | 2/1978 | Geschwender |
| 4,273,836 A | 6/1981 | Campbell et al. |

(Continued)

FOREIGN PATENT DOCUMENTS

| | | |
|---|---|---|
| EP | 0474161 A2 | 3/1992 |
| GB | 1390968 A | 4/1975 |

(Continued)

OTHER PUBLICATIONS

Canadian Office Action mailed Feb. 12, 2016, regarding application No. 2787819, 3 pages.

(Continued)

*Primary Examiner* — Alexander Thomas
(74) *Attorney, Agent, or Firm* — Yee & Associates, P.C.

(57) ABSTRACT

A method and apparatus for forming a ribbon configured for use in forming a honeycomb structure when the ribbon is in a folded state. The ribbon comprises a first edge and a second edge. At least one portion of the first edge is not parallel to at least one portion of the second edge when the ribbon is in an unfolded state.

18 Claims, 16 Drawing Sheets

(56) References Cited

U.S. PATENT DOCUMENTS

| | | |
|---|---|---|
| 4,411,381 A | 10/1983 | Ittner et al. |
| 4,457,963 A | 7/1984 | Ittner et al. |
| 4,548,665 A | 10/1985 | Morin |
| 4,777,070 A | 10/1988 | Huvey |
| 4,981,744 A | 1/1991 | Swank |
| 5,024,369 A | 6/1991 | Froes et al. |
| 5,064,493 A | 11/1991 | Smith, II |
| 5,126,183 A | 6/1992 | Smith, II |
| 5,150,507 A | 9/1992 | Goela et al. |
| 5,270,095 A | 12/1993 | Ito et al. |
| 6,372,322 B1 | 4/2002 | Devaguptapu |
| 8,481,143 B2 | 7/2013 | Dean et al. |
| 9,221,230 B2 | 12/2015 | Dean et al. |
| 2008/0145602 A1 | 6/2008 | Hendren et al. |
| 2013/0052396 A1 | 2/2013 | Dean et al. |
| 2013/0052398 A1 | 2/2013 | Dean et al. |

FOREIGN PATENT DOCUMENTS

| | | |
|---|---|---|
| GB | 2117679 A | 10/1983 |
| JP | S58025531 A | 2/1983 |
| JP | S5825531 B2 | 5/1983 |
| JP | S6183026 A | 4/1986 |
| JP | H0716967 A | 1/1995 |
| JP | H07186311 A | 7/1995 |
| WO | WO2008094743 A2 | 8/2008 |

OTHER PUBLICATIONS

State Intellectual Property Office of China First Notification of Office Action and English translation, regarding Application No. 201210410238.2, issued Jan. 25, 2016, 7 pages.

English Translation of Notice of Reasons for Rejection, issued May 24, 2016, regarding Japanese Patent Application No. 2012-18296, 2 pages.

State Intellectual Property Office of China Second Notification of Office Action and English translation, regarding Application No. 201210410238.2, issued Sep. 9, 2016, 13 pages.

Canadian Office Action, dated Jan. 10, 2017, regarding Application No. 2,787,819, 4 pages.

Partial European Search Report dated Mar. 18, 2013, regarding Application No. EP12181293.7, 6 pages.

Extended European Search Report dated May 28, 2013 regarding Application No. EP12181293.7, 10 pages.

Rieger, "Krone Basteln," Kinderspiele-Welt.de, May 2010, 8 pages. Accessed Jul. 1, 2013, http://www.kinderspiele-welt.de/basteln-und-werkeln/krone-basteln.html.

Office Action, dated Oct. 11, 2012, regarding U.S. Appl. No. 13/214,848, 15 pages.

Office Action, dated Jan. 2, 2013, regarding U.S. Appl. No. 13/214,848, 8 pages.

Notice of Allowance, dated Apr. 19, 2013, regarding U.S. Appl. No. 13/214,848, 13 pages.

Office Action, dated Sep. 30, 2014, regarding U.S. Appl. No. 13/588,826, 24 pages.

Final Office Action, dated Dec. 12, 2014, regarding U.S. Appl. No. 13/588,826, 5 pages.

Office Action, dated Mar. 17, 2015, regarding U.S. Appl. No. 13/588,826, 6 pages.

Office Action, dated Jun. 26, 2015, regarding U.S. Appl. No. 13/588,826, 5 pages.

Notice of Allowance, dated Aug. 25, 2015, regarding U.S. Appl. No. 13/588,826, 10 pages.

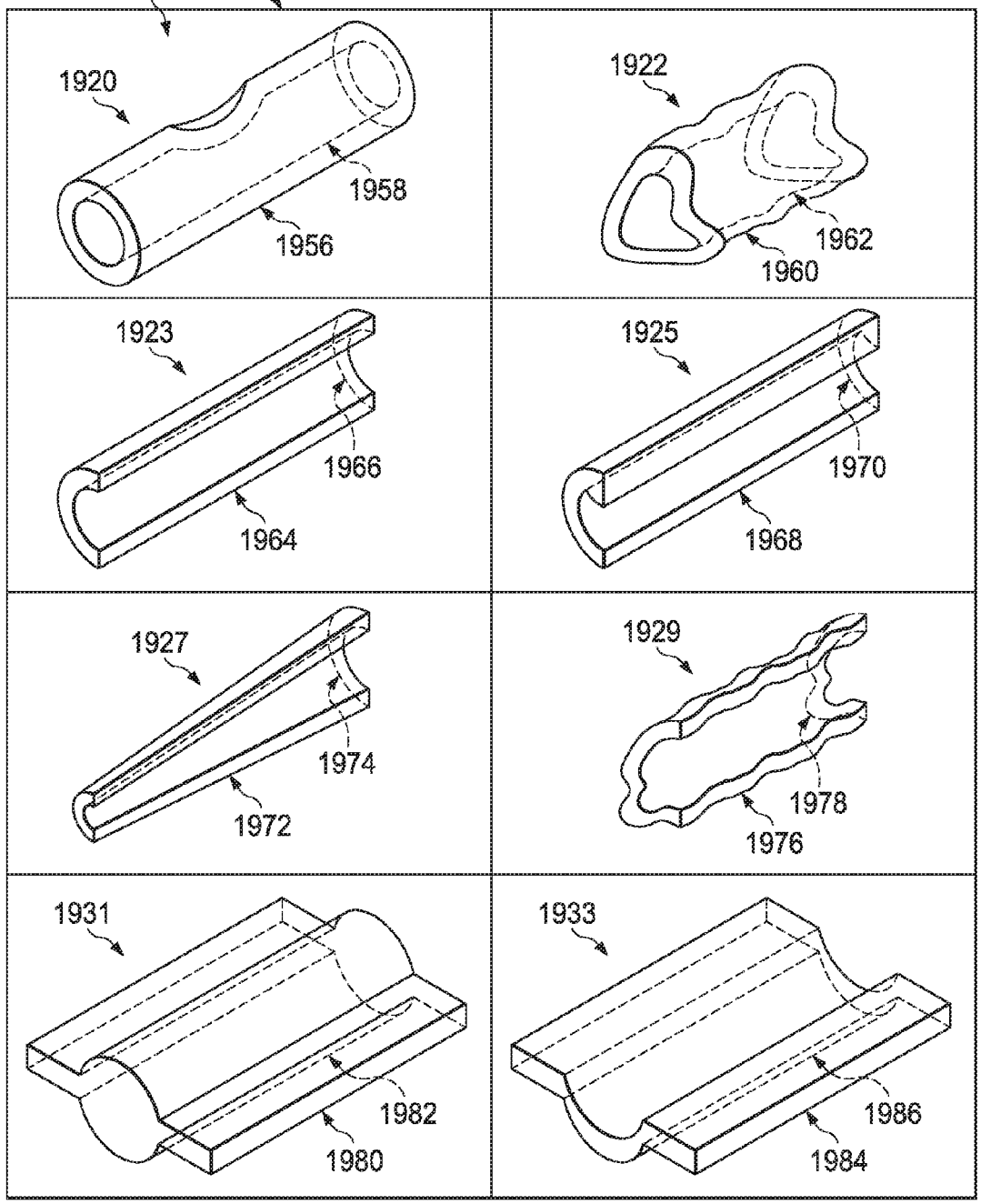

FORMING METHOD FOR A HONEYCOMB STRUCTURE

CROSS-REFERENCE TO RELATED APPLICATION

This application is a divisional of U.S. patent application Ser. No. 13/588,826, filed Aug. 17, 2012, now U.S. Pat. No. 9,221,230 entitled "A Honeycomb Structure", which is a continuation-in-part of U.S. patent application Ser. No. 13/214,848, filed on Aug. 22, 2011, now U.S. Pat. No. 8,481,143 entitled "Thick Curved Honeycomb Core with Minimal Forming". The contents of both aforementioned applications are incorporated herein by reference.

BACKGROUND INFORMATION

1. Field

This disclosure relates generally to cellular structures and, in particular, cellular structures having non-planar shapes. Still more particularly, the present disclosure relates to a method and apparatus for forming a cellular structure using ribbons configured to be folded and joined such that the cellular structure has a tree-dimensional (3D) shape.

2. Background

A honeycomb structure, also referred to herein as a "honeycomb core," a "core material" or simply a "core," typically comprises a plurality of abutting rectangular or hexagonal cells shaped to a desired form. Honeycomb structures are often used as structural support for their high strength to weight ratio due to the low density of the honeycomb formation.

Honeycomb structures are typically manufactured from a thin, flat base material such as metal or paper. The flat base material is cut into narrow, elongated strips or ribbons, which are folded or bent into contoured strips of semi-hexagonal peaks and troughs. For example, an elongated strip of a material may be scored at regularly spaced intervals. To form regular hexagonally shaped cells, the score lines would be parallel to the ends of the strip and the material would be folded along the score lines to an angle of about 60°, twice in one direction, then twice in the opposite direction, and continuously alternating in that fashion.

The resulting folded strips are then joined together using adhesive, spot welding techniques, brazing techniques, and/or other known joining methods to form a structure having a series of hexagonally shaped cells, thereby forming a flat or substantially planar honeycomb structure. Although cells in a honeycomb structure are typically hexagonal, honeycomb structures may also be formed from cells having non-hexagonal shapes.

The resulting honeycomb structure, which consists of a substantially planar structure having cells with walls oriented in a direction perpendicular to the flat surface of the structure, may be able to sustain large loads in a direction parallel to the walls of the honeycomb cells, while also being lightweight due to an absence of material within the cells.

In many applications, it may be desirable to form a honeycomb structure that is non-planar. Various methodologies and apparatuses have been developed for shaping honeycomb structures into particular non-planar shapes.

For example, without limitation, some currently available methods for forming curved honeycomb structures begin with a pre-formed flat honeycomb structure and then mold or form this flat honeycomb structure into a desired shape that is non-planar.

As one illustrative example, one method of producing a contour consisting of short angle bends in a honeycomb structure consists of first manufacturing a flat honeycomb core material. A force is applied to cells of the flat honeycomb structure to deform or collapse the honeycomb cells in the area in which the short angle bend is desired. This deformation of the honeycomb cells results in a honeycomb structure having a short radius bend area possessing cells with a height similar to the height of cells in the non-collapsed area.

Other methods of contouring core material consist of passing a pre-formed, flat honeycomb core material through a series of rollers that deforms the hexagonal cells and allows them to be bent in different directions. Still further methods of forming core material into a desired shape consist of beginning with a flat core material and forcing the core material against and into a die having the required contour.

All of the foregoing methodologies require the application of force to a flat honeycomb structure in order to form it into a desired shape, which may lead to undesirable stresses in the honeycomb structure. Further, the strength and stiffness of the core are sacrificed due to the fact that the honeycomb cell walls are no longer normal to the surface of the core.

Other methods generally avoid bending or folding a fully assembled honeycomb core material. Instead, these methods begin by forming flat, rectangular strips having a plurality of sections along the length of the strips, the sections being separated by fold lines. The strips are folded at the fold lines and joined together to form a desired honeycomb contour shape without additional application of force to the honeycomb core.

For example, some methods contemplate the formation of a honeycomb structure having hexagonally shaped cells wherein some cell walls possess a tapering V-shaped crimp. By placing all crimped edges on one side of the honeycomb structure, and all non-crimped edges on the opposite side of the honeycomb structure, the crimped side is made to be shorter than the non-crimped side. This facilitates variation in the radii of curvature of the honeycomb structure, which leads to a curved core material.

Other methods contemplate forming rectangular strips wherein the fold lines are placed along the length of the strips, such that the sections between the fold lines are not regularly shaped. Fold lines are placed in the strips such that when folded, the entire edges of the strips form an overall curved structure. When the folded strips are adhered together, the resulting core material has a desired contour. For example, Japanese Laid-Open Patent Publication No. 58-25531 and U.S. Pat. No. 5,270,095 disclose strips having some fold lines perpendicular to the length of the strip and other fold lines that are slanted in relation to the length of the strip. In a flat or unfolded state, the edges of the strip are straight and form a rectangle. In a folded state, the slanted fold lines create a folded strip with straight edges that form an overall curved structure determined by the angle of the slant in the fold lines. However, this process has limited utilization in that it can be used to manufacture honeycomb core having only a single shape.

What is needed is a simplified method of manufacturing contoured honeycomb structures that does not introduce undesired stresses or sacrifice strength and stiffness of the structure, and permits formation of contoured honeycomb core in a wide variety of shapes and sizes with minimal forming steps to provide manufacturing cost and time efficiencies.

SUMMARY

In one aspect of the disclosure, a ribbon configured for use in forming a honeycomb structure when the ribbon is in a folded state includes a first edge and a second edge. At least one portion of the first edge is not parallel to at least one portion of the second edge when the ribbon is in an unfolded state.

In another aspect of the disclosure, a honeycomb structure comprises a first surface, a second surface, at least one ribbon, and a plurality of cells. The at least one ribbon comprises a first edge and a second edge. The first edge forms at least a portion of the first surface when the at least one ribbon is in a folded state. The second edge forms at least a portion of the second surface when the at least one ribbon is in the folded state. At least one portion of the first edge is not parallel to at least one portion of the second edge when the at least one ribbon is in an unfolded state. The plurality of cells is at least partially formed by the at least one ribbon.

In yet another aspect of the disclosure, a honeycomb structure comprises a plurality of cells, a first surface, and a second surface. The plurality of cells is configured such that at least two closed parallel cross-sections of a cell in the plurality of cells are different. The first surface is formed by the plurality of cells. The second surface is formed by the plurality of cells.

In still yet another aspect of the disclosure, a method for forming a ribbon for use in a honeycomb structure is provided. A first edge and a second edge of the ribbon are shaped such that at least one portion of the first edge is not parallel to at least one portion of the second edge when the ribbon is in an unfolded state.

In yet another aspect of the disclosure, a method for forming a honeycomb structure comprising a plurality of cells is provided. A first edge and a second edge of at least one ribbon are shaped such that at least one portion of the first edge of the at least one ribbon is not parallel to at least one portion of the second edge of the at least one ribbon when the at least one ribbon is in an unfolded state. The plurality of cells is formed at least partially using the at least one ribbon in a folded state.

These and other features and advantages of the invention in its various aspects, as demonstrated separately or in combination by one or more of the various examples, will become apparent after the consideration of the ensuing description, the accompanying drawings, and the appended claims. The drawings are for illustrative purposes only and are not intended to limit the scope of the present disclosure.

BRIEF DESCRIPTION OF THE DRAWINGS

Various aspects of the disclosure will now be described with reference to the accompanying drawings, wherein:

FIGS. 19A and 19B are an illustration of a table of possible shapes for a honeycomb structure in accordance with an aspect of the disclosure;

Reference will now be made to the drawings, in which similar elements bear the same reference numerals.

DETAILED DESCRIPTION

The following disclosure describes improved methods and materials for manufacturing a curved honeycomb core having a desired geometrical shape from a plurality of ribbons with minimal forming steps and stresses, including methods for determining preferred ribbon geometries for manufacturing an at least partially curved honeycomb core having a desired shape. It will be understood by those skilled in the art that the principles of the methods and materials disclosed herein may be applied to form a wide variety of ribbon geometries and, thus, honeycomb core structures having a wide variety of geometrical shapes.

As used herein, the terms "geometry" or "geometries" or "geometrical", when referring to ribbons means the shape and size of the ribbon, placement of fold lines in the ribbon and the structure of the ribbon edges (e.g., straight edge or curved edge), and when referring to honeycomb core, means the shape and size of the core, the shape and size of cells within the core and the shape and size of the core's inner and outer surfaces (e.g., curved and/or planar) and the direction of the core's axis.

For example, without limitation, the principles disclosed herein may be applied to form honeycomb cores having, e.g., curved geometrical shapes including any radial portion of (such as a "semi-cylindrical" tube having a semi-circular cross-section) or the whole of a cylinder having an arbitrary curvature. Generally, cylindrical shapes have a central axis, and outer and inner surfaces, which together define a thickness. Both the thickness and the axis may vary from point to point on the cylinder. In other words, the axis of the cylindrical shape may have curvature that changes along its length and the thickness of the cylindrical shape may vary as well.

The cross-sectional shape of the cylinder, taken by a plane having a normal parallel to the axis of the cylinder, may also vary along the length of the axis, and may have varying eccentricity, radii, and other parameters. Therefore, as used herein, the terms "cylinder" or "cylindrical" are not limited to a regular cylinder having a straight axis and a constant circular cross-section, but can refer to any of a variety of tubular geometries having a varying cross-section surrounding a straight or curved axis including, for example, a curved radome, a cone shape, or other cylindrical shapes. The terms "cylinder" or "cylindrical" and "tube" or "tubular" may be used interchangeably throughout this specification. It will be appreciated that variations in the geometry, composition, and construction of such honeycomb cores can be adapted depending on their intended use in accordance with the teachings of this disclosure.

Figure 1:
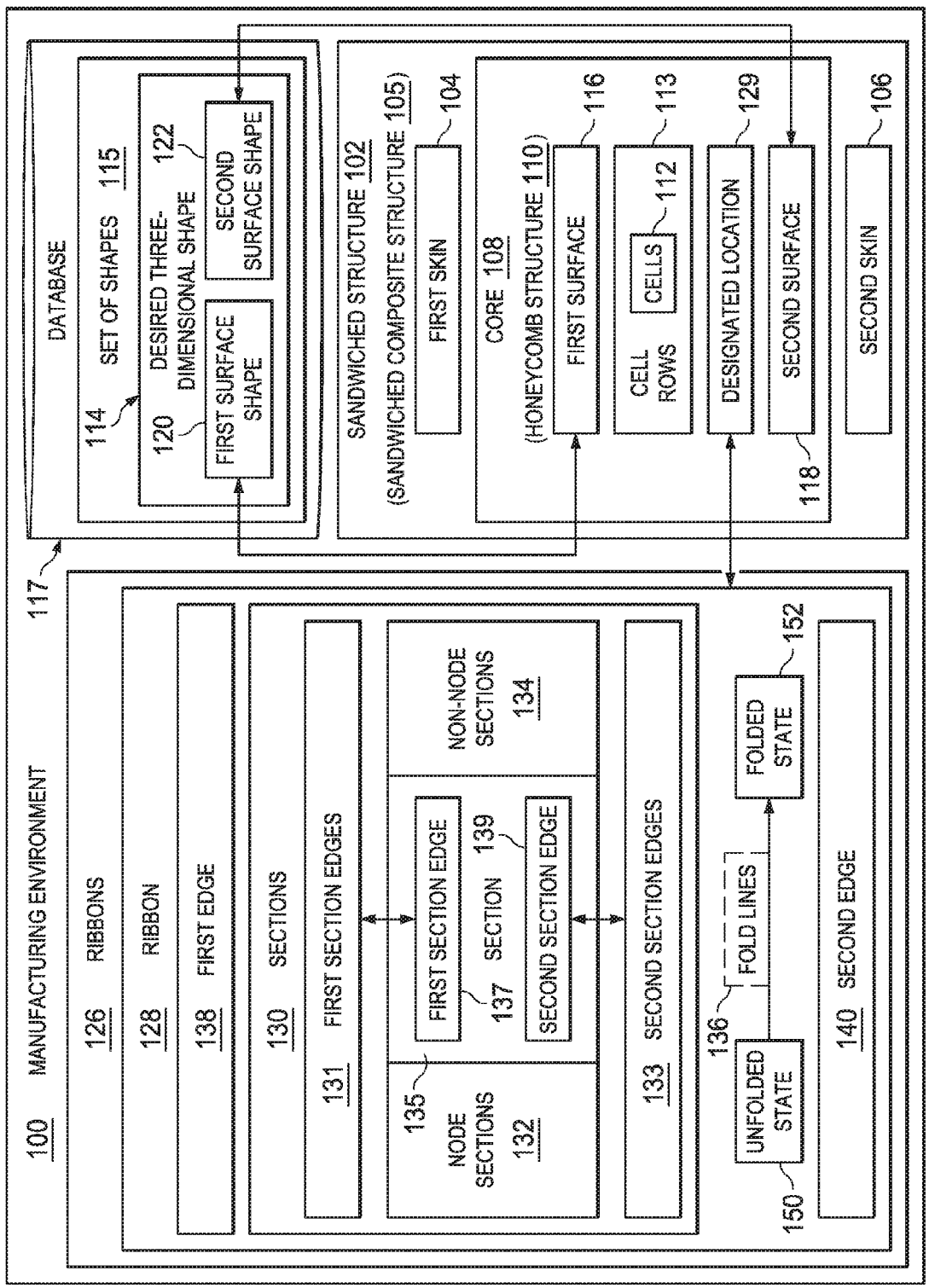
FIG. 1 is an illustration of a manufacturing environment in the form of a block diagram in accordance with an aspect of the disclosure.

Referring now to the figures and, in particular, to FIG. 1, an illustration of a manufacturing environment in the form of a block diagram is depicted in accordance with an illustrative example. The manufacturing environment 100 depicted in FIG. 1 may be an example of one environment in which a sandwiched structure 102 may be manufactured.

As depicted, the sandwiched structure 102 may comprise a first skin 104, a second skin 106, and a core 108. The core 108 may be located between the first skin 104 and the second skin 106. In particular, the sandwiched structure 102 may be manufactured by attaching the first skin 104 and the second skin 106 to the core 108 such that the core 108 is sandwiched between the first skin 104 and the second skin 106. In one illustrative example, the sandwiched structure 102 takes the form of a sandwiched composite structure 105.

In these illustrative examples, the core 108 may be implemented using a honeycomb structure 110. As used herein, the honeycomb structure 110 comprises an array of hollow cells having thin vertical walls. In one illustrative example, these vertical walls are substantially perpendicular to the first skin 104 and the second skin 106.

For example, the honeycomb structure 110 may comprise a plurality of cells 112. In some cases, the cells 112 may be organized into a plurality of cell rows 113. Each of the cells 112 may be columnar and may have a shape selected from one of, for example, without limitation, a hexagonal shape, a rectangular shape, a square shape, an octagonal shape, a pentagonal shape, a triangular shape, a circular shape, an elliptical shape, or some other type of shape. In some cases, each of the cells 112 may have a shape that is an approximation of one of the shapes described above.

The cell rows 113 may be arranged such that adjacent rows are aligned substantially parallel to each other. Depending on the implementation, the cell rows 113 may be arranged in any orientation relative to the overall shape of the honeycomb structure 110. For example, the cell rows 113 may be oriented parallel to, perpendicular to, or at some angle relative to a longitudinal axis of the honeycomb structure 110.

In these illustrative examples, the honeycomb structure 110 is formed such that the honeycomb structure 110 has a desired three-dimensional (3D) shape 114. In one illustrative example, the desired three-dimensional shape 114 may be selected from, for example, without limitation, a set of shapes 115 stored in a database 117. As used herein, a "set of" items means one or more items. In this manner, a set of shapes may be one or more shapes.

The shape selected from the database 117 may be a three-dimensional shape formed by a first surface shape 120 and a second surface shape 122. The first surface shape 120 may be, for example, an outer surface shape, while the second surface shape 122 may be, for example, an inner surface shape. In these illustrative examples, at least a portion of the first surface shape 120 is not parallel to at least a portion of the second surface shape 122. For example, without limitation, the desired three-dimensional shape 114 may be a cylindrical tube shape, a radome shape, a semi-spherical shape, a prism-type shape, a horseshoe-type shape, a donut-type shape, a curved shape, a conical shape, or some other type of shape.

The honeycomb structure 110 of the composite structure 102 has a first surface 116 and a second surface 118. These two surfaces are discontinuous surfaces. In other words, the first surface 116 and the second surface 118 may not be solid surfaces because the cells 112 that form the honeycomb structure 110 are hollow at both ends of cells 112. The honeycomb structure 110 is formed having the desired three-dimensional shape 114 such that the first surface 116 has the first surface shape 120 and the second surface 118 has the second surface shape 122. Consequently, at least a portion of the first surface 116 of the honeycomb structure 110 is not parallel to at least a portion of the second surface 118 of the honeycomb structure 110.

In these illustrative examples, the honeycomb structure 110 is formed by a plurality of ribbons 126. These ribbons are joined together using one or more different types of joining techniques. The different types of joining techniques that may be used to join the ribbons 126 may include, but are not limited to, welding, brazing, gluing, curing, and/or other types of processes.

The ribbons 126 may be joined according to a predetermined order such that each of the ribbons 126 has a particular position and orientation in the honeycomb structure 110. In these illustrative examples, when the ribbons 126 are positioned relative to each other and joined together, the ribbons 126 create the honeycomb structure 110 having the desired three-dimensional shape 114. In particular, once the ribbons 126 are joined together to form the honeycomb structure 110, this honeycomb structure 110 may have the desired three-dimensional shape 114 without requiring additional forming operations to achieve this desired shape.

In these illustrative examples, each of the ribbons 126 is manufactured having a geometry based on the designated location for that ribbon within the honeycomb structure 110.

For example, a ribbon 128 may be configured to have a designated location 129 within the honeycomb structure 110. The designated location 129 may include both a position for the ribbon 128 relative to other ribbons the honeycomb structure 110 and/or an orientation for the ribbon 128.

The position of the ribbon 128 relative to the other ribbons may be determined by the number of ribbons on either side of the ribbon 128 within the honeycomb structure 110. The orientation of the ribbon 128 may be defined with respect to the desired three-dimensional shape 114. For example, without limitation, when the desired three-dimensional shape 114 is a cylindrical tube shape, the orientation of the ribbon 128 may be described with respect to a lengthwise center axis of the cylindrical shape. In these illustrative examples, all of the ribbons 126 are configured to have the same orientation.

The ribbon 128 has a folded state 152 within the honeycomb structure 110. The ribbon 128 may be folded along fold lines 136 arranged generally transversely along the ribbon 128 to facilitate the change from an unfolded state 150 of the ribbon 128 into the folded state 152. In some cases, these fold lines 136 may be imaginary fold lines or conceptual fold lines. In other cases, these fold lines 136 may be marked on the ribbon 128 using, for example, ink, color, perforations, and/or some other type of marking.

In the unfolded state 150, the ribbon 128 is planar. In other words, the ribbon 128 is laid out flat in the unfolded state 150. The ribbon 128 is manufactured in the unfolded state 150 with a preselected geometry based on the designated location 129 for the ribbon 128 within the honeycomb structure 110 and the way in which the ribbon 128 is to be folded.

As depicted, the ribbon 128 has a first edge 138 and a second edge 140. The first edge 138 and the second edge 140 of the ribbon 128 are shaped such that at least one portion of the first edge 138 is not parallel to at least one portion of the second edge 140 when the ribbon 128 is in an unfolded state 150.

In these illustrative examples, the ribbon 128 comprises a plurality of sections 130. These sections 130 may be generally defined or separated by the fold lines 136 arranged generally transversely along the ribbon 128.

The sections 130 of the ribbon 128 have first section edges 131 and second section edges 133. The first section edges 131 and the second section edges 133 are shaped such that the ribbon 128 has a specific geometry when the ribbon 128 is in the unfolded state 150. For example, a first section edge of at least one section of the sections 130 is not parallel to a second section edge of at least one other section of the sections 130 when the ribbon 128 is in the unfolded state 148.

As one illustrative example, a section 135 has a first section edge 137 and a second section edge 139. At least one portion of the first section edge 137 may not be parallel to at least one portion of second section edge 139. In some cases, at least a portion of the first section edge 137 and/or at least a portion of the second section edge 139 may not be parallel to at least a portion of another second section edge and/or at least a portion of another first section edge, respectively, of another ribbon section.

Additionally, at least one section of the sections 130 of the ribbon 128 may have a first section edge with a first radius of curvature and a second section edge with a second radius of curvature in which the first radius of curvature and the second radius of curvature are the same or different. In some illustrative examples, at least one section of the sections 130 of the ribbon 128 may have at least one section edge that has a radius of curvature that changes along the length of the section edge.

In some illustrative examples, the sections 130 of the ribbon 128 include a plurality of node sections 132 and a plurality of non-node sections 134. In these examples, the node sections 132 and the non-node sections 134 may alternate such that no two sections of the same kind are adjacent to each other in the ribbon 128.

As used herein, a "node section" of a ribbon, such as one of the node sections 132, is a section of the ribbon configured to be joined with a corresponding node section of another ribbon. In other words, a node section of a ribbon is configured such that another ribbon may come into contact with a side of the node section and be joined to the ribbon at this side of the node section.

As used herein, a "non-node section" of a ribbon, such as one of the non-node sections 134, may be a section of the ribbon configured such that this section does not come into contact with any section of another ribbon. In other words, a non-node section of a ribbon is configured such that both sides of the non-node section remain exposed when another ribbon is joined to the ribbon.

In one illustrative example, a first section edge and a second section edge of a node section in the node sections 132 may be at least partially linear when the ribbon 128 is in the unfolded state 150, while a first section edge and a second section edge of a non-node section in the non-node sections 134 are at least partially curved and not parallel to each other when the ribbon 128 is in the unfolded state 150. In this example, the node section may be rectangular, while the non-node section may a trapezoidal-type shape. In particular, the non-node section may be a curved trapezoidal shape.

When the ribbon 128 is folded into the folded state 152 in this illustrative example, at least portions of the first section edges of the node sections 132 may be substantially parallel to each other and at least portions of the first section edges of the non-node sections 134 may be angled and/or curved relative to the first section edges of the node sections 132.

Further, when the ribbon 128 is in the folded state 152, the first edge 138 and the second edge 140 of the ribbon 128 may substantially conform to the portion of the first surface shape 120 and the second surface shape 122, respectively, corresponding to the designated location 129 for the ribbon 128 within the honeycomb structure 110. In particular, the first edge 138 may substantially conform to a curve or another geometric feature along the first surface shape 120 and the second edge 140 may substantially conform to a curve or another geometric feature along the second surface shape 122.

The curve along the first surface shape 120 may have one or more different radii of curvature along the length of the curve. Similarly, the curve along the second surface shape 120 may have one or more different radii of curvature along the length of the curve. In other words, the first edge 138 and/or the second edge 140 of the ribbon 128 may have one or more different radii of curvature along the lengths of these edges. The different radii of curvature may have a range between a value above zero and up to infinity. When the radius of curvature for a portion of one of the first edge 138 and the second edge 140 is infinity, the portion may be straight or linear.

In this manner, the ribbons 126 used to create the honeycomb structure 110 may be implemented in a variety of different ways. In one illustrative example, each of the ribbons 126 may be implemented in a manner similar to the ribbon 128 described above such that all of the ribbons 126 have the same geometry in the unfolded state 150. Each of the ribbons 126 having the same geometry may allow the ribbons 126 to be manufactured more quickly and more easily as compared to when the ribbons 126 have different geometries. Further, assembly of the ribbons 126 to form the honeycomb structure 110 may be performed more quickly and easily when all of the ribbons 126 have the same geometry.

However, in some illustrative examples, a portion of the ribbons 126 may have the same geometry as the ribbon 128 described above, while another portion of the ribbons 126 may have different geometries. In other illustrative examples, each of the ribbons 126 may be manufactured having different geometries.

The ribbon 128 described above, when in the folded state 152, may be joined with at least one other ribbon in a corresponding folded state to form at least a portion of the cells 112 that make up the honeycomb structure 110. For example, when the ribbon 128 is in the folded state 152, one side of the ribbon 128 may be joined with another ribbon in the ribbons 126 in a corresponding folded state to form one of the cell rows 113. The non-node sections of these ribbons may form the walls of the cells in the cell row.

Of course, in other illustrative examples, the ribbon 128 described above may be the only ribbon used to form honeycomb structure 110. For example, the ribbon 128 may form the entire honeycomb structure 110 when the ribbon 128 is in the folded state 152. The ribbon 128 may be folded along one direction, wrapped around, and then folded along the opposite direction any number of times to form the honeycomb structure 110. As the ribbon 128 is folded and wrapped, the node sections 132 of the ribbon 128 may be joined together such that the cells 112 of the honeycomb structure 110 are created.

Manufacturing a single ribbon with the necessary geometry to form the honeycomb structure 110 may be less time-consuming and/or may be easier than manufacturing multiple ribbons that need to be cut and joined together. For example, using multiple ribbons may require additional effort and time to keep track of the ribbons, especially the ribbons with different geometries, during the folding and joining of the different ribbons to form the honeycomb structure 110.

The illustration of the manufacturing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

With reference now to FIGS. 2-10, illustrations describing one manner in which honeycomb structure 110 from FIG. 1 may be implemented are depicted. In FIGS. 2-10, an example of a honeycomb structure formed by hexagonally shaped cells is described.

Figure 2:
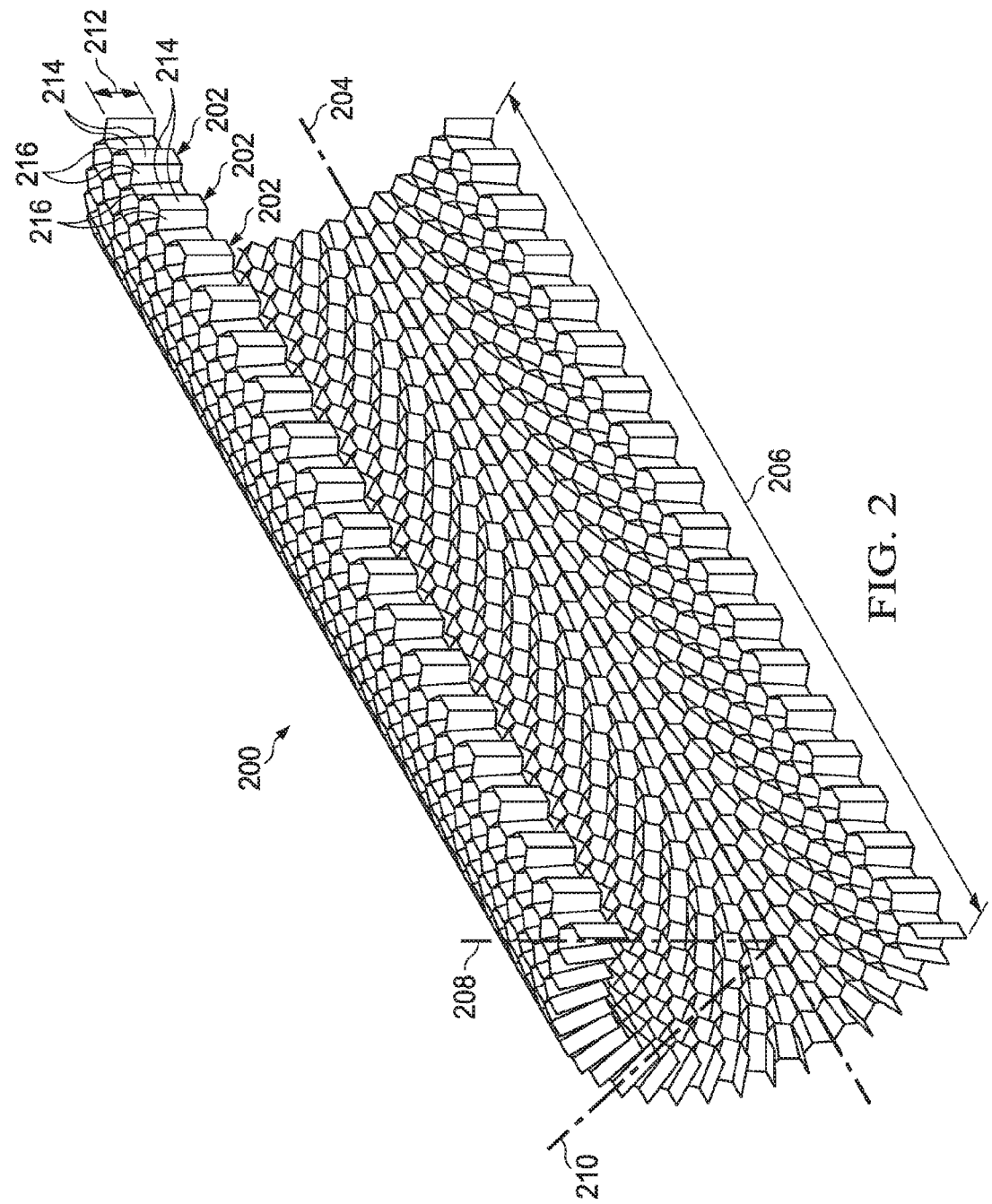
FIG. 2 is an illustration showing a perspective view of an example honeycomb core in accordance with an aspect of the disclosure.

Turning now to FIG. 2, an illustration of a core is depicted in accordance with an illustrative embodiment. In FIG. 2, core 200 may be an example of one implementation for core 108 in FIG. 1. The core 200 may be a honeycomb core in these illustrative examples. In other words, the core 200 may be implemented using a honeycomb structure, such as honeycomb structure 110 in FIG. 1.

For ease of description, the core 200 is shown in the shape of a regular cylinder having a straight axis 204 and a thickness 212. The core 200 comprises a series of folded ribbons 205 joined in a side-by-side manner. The ribbons 205 are shaped precisely so that when folded and joined together, they form the desired curved honeycomb geometry, including a series of abutting hexagonally shaped cells 202 extending from an outer surface of the core to an inner surface of the core and having a thickness 212. With a sufficient number of ribbons 205 joined in this fashion, any portion of a cylindrical geometry having desired curvatures may be formed.

Figure 10:
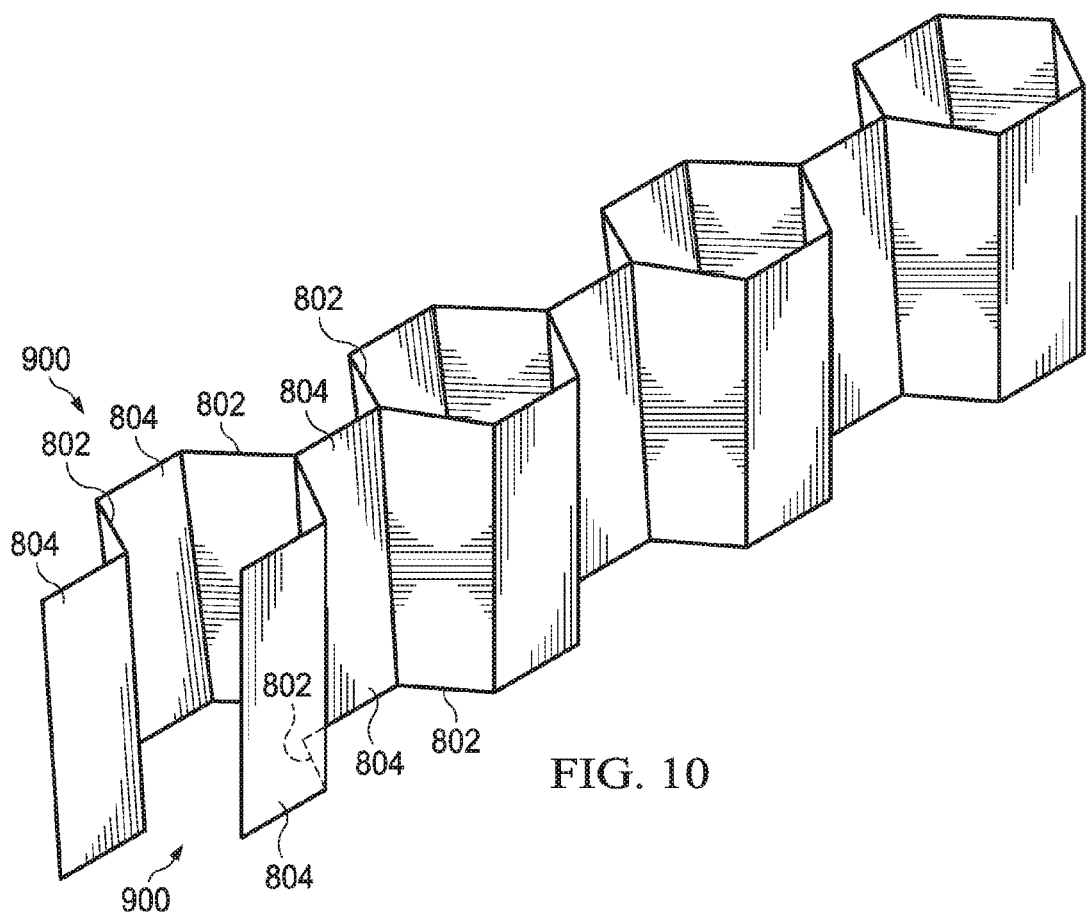
FIG. 10 is an illustration showing a perspective view of a plurality of ribbons joined together to make a honeycomb core in accordance with an aspect of the disclosure.

Each of the abutting cells 202 comprises a plurality of walls, including node walls and non-node walls, and top and bottom hexagonally shaped faces corresponding to the outer and inner surfaces of the core 200, respectively. Node walls 214 are walls that provide surfaces for two adjacent ribbons 205 to be joined together, as shown in FIG. 10. Non-node walls 216 are all other walls that comprise the cells 202. As described below, the node walls 214 are tapered inward from the top face to the bottom face such that the top face has an area that is greater than the bottom face and each of the cells 202 has a tapered wedge shape. Unlike methods of making a curved honeycomb core from a flat honeycomb core, which may require stronger forces to be applied to the flat honeycomb core, the methods and materials provided herein allow the manufacture of a honeycomb core having a desired curvature without the application of strong forces and with minimal forming.

Figure 9:
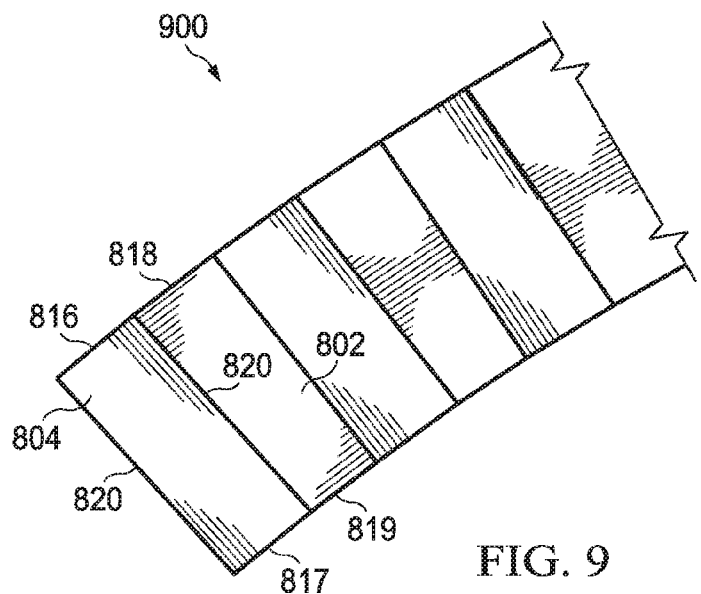
FIG. 9 is an illustration of geometry consisting of the shape of a flat ribbon used to make a honeycomb core in accordance with an aspect of the disclosure.

A close-up of a specific example of a ribbon geometry that may be used to form the regular cylinder honeycomb core shown in FIG. 1 can be seen in FIG. 9. The ribbon 900 is in an un-folded or flat state. Because the cylinder is regular, the geometry of the ribbon 900 is also regular—it comprises a repeating series of rectangular sections 804 followed by trapezoidal sections 802. However, it should be understood that for less regular core geometries, the geometry of the ribbon is not necessarily regular. Thus, for an irregularly shaped honeycomb core, ribbons may comprise a series of sections having shapes that are different from each other. The term "sections" as used herein refers to the discrete shapes, such as rectangle 804 and trapezoid 802, that comprise the ribbons. In the rectangular sections 804, the top and bottom edges are straight and perpendicular to the fold lines that form the side edges of the sections. In the trapezoidal sections 802, the top and bottom edges are curved to conform to or match the curvature of the inner and outer surfaces of the formed honeycomb core.

As described above, these section shapes may vary depending on the desired geometry of the honeycomb core. It should be understood that the geometry of the ribbon is defined by the shape of these sections. For example, the geometry of the ribbon 900 in FIG. 9 is defined by the fact that a rectangular section having a defined shape is joined to a trapezoidal section having a defined shape, and so forth. A consequence of this particular combination of section shapes is that the edges of the ribbon as a whole are "curved" along the length of the ribbon when the ribbon is in a flat or unfolded state. However, this curvature is not necessarily found in all ribbon geometries that may be used in accordance with the principles of this disclosure. When folded, however, the edges of the folded ribbon are straight.

In addition to being defined by the geometry of the honeycomb core 200, the geometry of the ribbon 900 is also defined by the shape of the cells 202. In FIG. 2, these cells are elongated, tapered hexagonal cells. Preferably, the shape of these cells is determined, and then the geometry of the ribbons is determined based on the shape of the cells. This is described in greater detail with respect to FIGS. 4 and 5 and FIGS. 6-9 below. FIG. 9 discloses one preferred method for determining the geometry of a ribbon.

Figure 8:
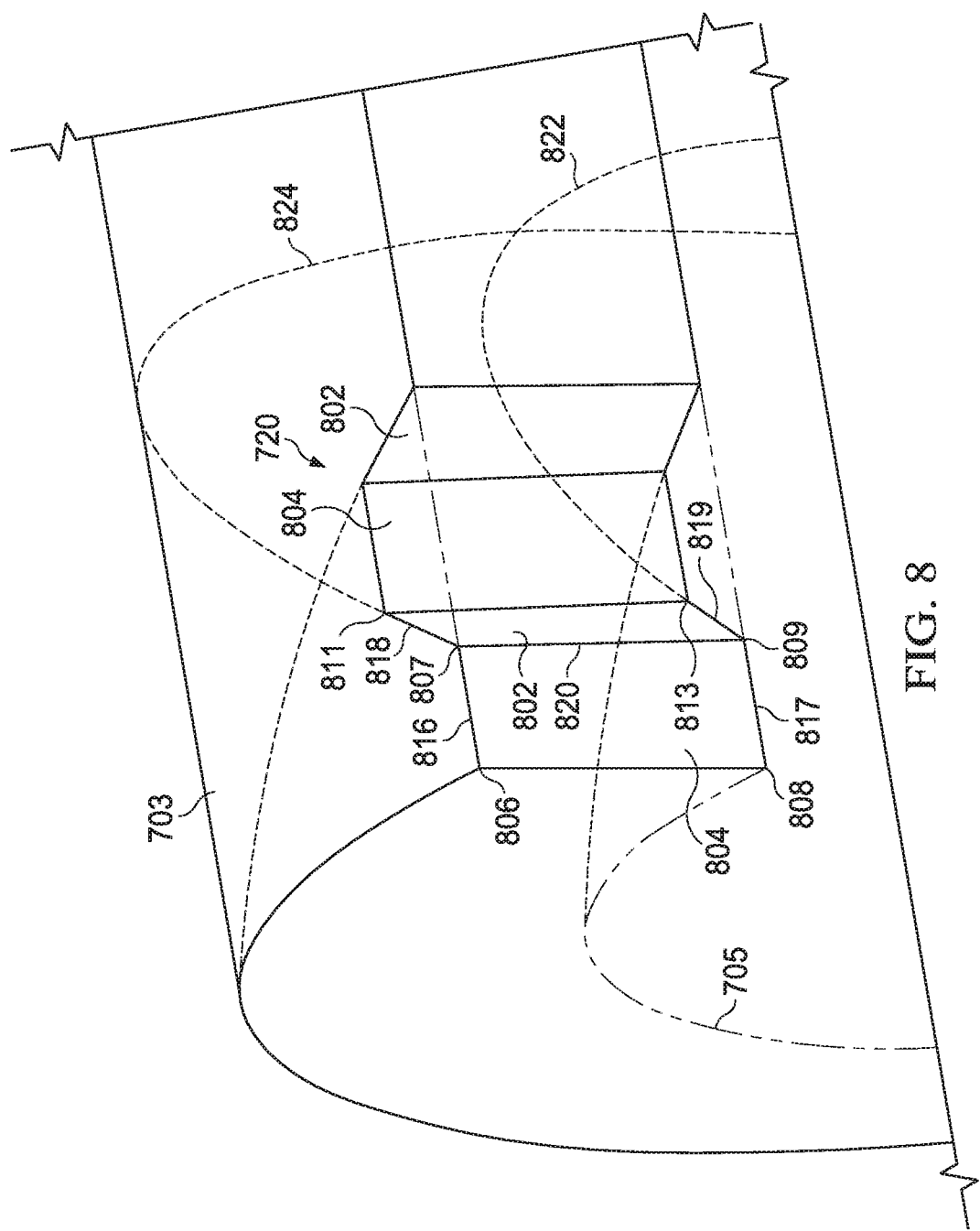
FIG. 8 is an illustration depicting determining the shape of sections of a ribbon used to make a honeycomb core in accordance with an aspect of the disclosure.

A common feature among ribbons having different geometries that are formed in accordance with the principles in this disclosure is that the edges of each of the sections of the ribbons are designed to exactly or very nearly match the shape of the portion of the honeycomb core which it forms. For the example ribbon 900 depicted in FIG. 9, edge 818 is curved. When this ribbon 900 is folded, as shown in FIG. 8, which depicts a close-up view of a portion of a folded ribbon embedded within a regular cylinder, edge 818 matches the curvature of the portion of the outer surface of the honeycomb core that it forms. This curvature is represented by ellipse 824. As can be seen, edge 818 matches the curvature of this ellipse 824, which denotes the curvature of the cylindrical surface in the direction of edge 818. It can also be seen that edge 816, which is not curved, but straight, matches the shape of the portion of the outer surface of the honeycomb core that it forms. Because edge 816 is parallel to the axis of the cylinder, and because the cylindrical surface is simply a straight line in that direction, edge 816, which "matches" this straight line, is not curved. A detailed description of the methodology for determining the geometries of the ribbons, edges and sections is disclosed below.

The shapes of various objects discussed herein may be determined using geometrical principles. Some of the geometrical determinations may be made using basic mathematical principles. However, for complex shapes, while basic mathematical principles may be used, it is considered more practical to determine the shapes of such objects using numerical methods. As one of the most powerful tools for using numerical methods to determine complex geometrical shapes is 3D CAD software, some of the disclosure provided herein will make reference to operations conducted on such software. Virtually any 3D CAD software package capable of performing such operations or equivalents should be suitable to the task of making the geometrical determinations disclosed herein. One such software package is CATIA from Dassault Systèmes of Vélizy-Villacoublay, France.

With reference now to FIGS. 3-10, illustrations for a procedure for manufacturing a honeycomb core with a desired curved geometry are described in accordance with an illustrative embodiment. The process described in FIGS. 3-10 may be an illustrative example of one manner in which a core, such as honeycomb core 200 in FIG. 2 may be formed with the desired curved geometry.

Figure 3:
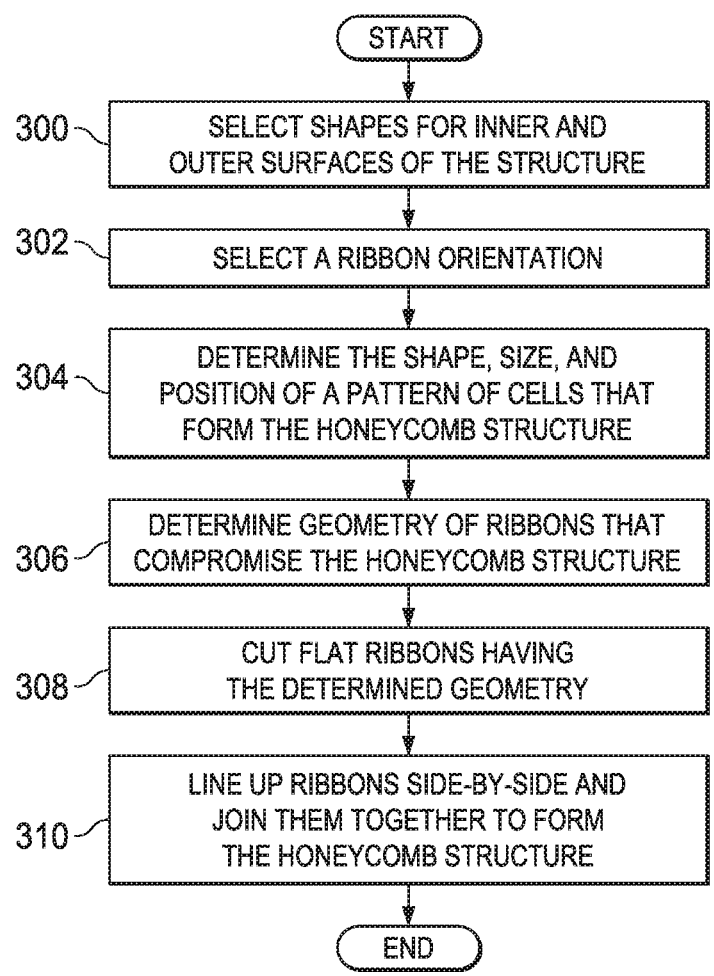
FIG. 3 is an illustration of steps of a method of manufacturing a honeycomb core in accordance with an aspect of the disclosure.

Turning now to FIG. 3, an illustration of a general process for forming a honeycomb core in the form of a flowchart is depicted in accordance with an illustrative embodiment. This process makes reference to various geometrical shapes that may be represented mathematically or using a computer model.

In step 300, the shapes of outer and inner surfaces of a honeycomb core to be constructed are selected. These surfaces represent outer and inner walls of the final product that will be manufactured using the methodologies of this disclosure. A desired tubular shape is therefore provided in the form of mathematical parameterizations, or 3D CAD computer models, for an inner and outer surface of the desired tubular shape. It should be understood that this tubular shape may be any of a wide variety of curved cylindrical geometries.

It should also be understood that these inner and outer surfaces can be thought of in several ways. In particular, the inner surfaces and outer surfaces may represent approximations of the actual geometry of the honeycomb core. Further, the inner surfaces and outer surfaces may represent an "intended" overall shape of the honeycomb core. However, these surfaces may not necessarily represent the geometry of the actual finished honeycomb core product.

Figure 7:
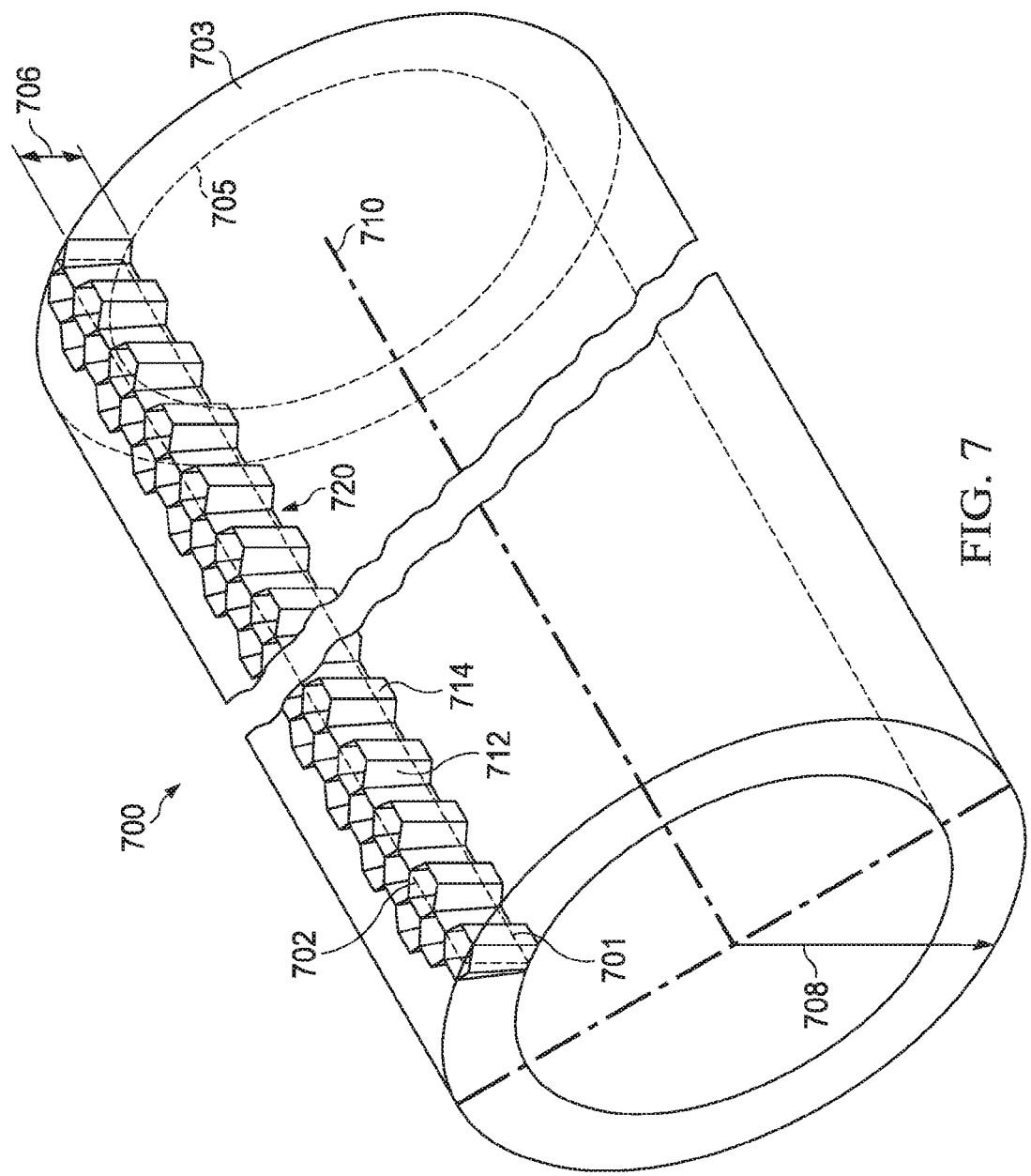
FIG. 7 is an illustration depicting determining the shape of a ribbon used to make a honeycomb core in accordance with an aspect of the disclosure.

For example, FIG. 7 depicts inner surface 705 and outer surface 703, which are cylindrical in shape. However, it can be seen from, e.g., FIG. 2, that the actual shape of the honeycomb core is a composite structure comprised of a plurality of hexagonal cells, which together form a cylindrical shape. The inner and outer surfaces are thus simply analytical tools used to design a honeycomb core having a desired overall shape.

In step 302, a ribbon orientation is selected. This is the direction along the honeycomb core at which ribbons will lie. The ribbon orientation relates to the shape of the cells of the honeycomb core as well as the geometries of the ribbons themselves. Preferably, a ribbon orientation should be selected such that the honeycomb core can be made using the smallest number of different ribbon geometries. It is desirable to use as few ribbon geometries as possible to provide cost and manufacturing time efficiencies. This can be done by determining a direction in which the cylinder has symmetry, and then selecting the ribbon orientation such that it is aligned with that symmetry. If this is optimally done, ribbons of identical geometry may be used to form the entire cylindrical core. This is described in further detail below, with respect to FIGS. 4-9.

In step 304, the shape, size and position of a pattern of cells that form the honeycomb core is determined. Each cell has inner and outer faces, which lie on the inner and outer surfaces of the cylindrical core, respectively. The shape of the cells may be pre-known or pre-determined. Alternatively, the shape of the cells may be determined using the procedures disclosed with reference to FIGS. 4 and 5, below. The geometry of the ribbons to be determined is based on the determined shape of the cells.

Generally, it is beneficial for the cells 202 to be shaped and positioned such that they form a staggered series of interlocking cells 202, as shown for example in FIG. 2. This is typically done by choosing hexagonally shaped cells, but a wide variety of interlocking cell types are known and may be employed with the teachings of this disclosure. Any polygonal shape may be used, including shapes having curved edges. Preferably, the cells are shaped such that node-walls are generally parallel to the ribbon orientation, to facilitate connection between adjacent ribbons. One example of a non-hexagonal shape can be found in the standards document for product code number AMS4177 from SAE International of Warrendale, Pa., USA. The cell shape described in that document has an irregular shape, which may be described as "sombrero" having a wide, curved, bowl-shaped bottom portion and a narrow triangular top portion. These shapes form an interlocking pattern of cells in which the space between two bowl-shaped portions of adjacent cells is identical to the shape of the narrow triangular top portion of another cell in a staggered position, and similarly, the space between two narrow triangular top portions in adjacent cells is identical to the shape of the bowl-shaped bottom portion of another cell in a staggered position.

In step 306, the geometry of the ribbons that comprise the cylindrical honeycomb core is determined based on the pattern of cells determined in step 304. The methodology for determining the geometry of these ribbons is described in more detail with reference to FIGS. 6-9 below.

It is contemplated that both steps 304 and 306, in which geometrical shapes of physical objects are determined, may be performed using mathematical principles, computer methods or some combination of both.

In step 308, flat ribbons are cut out of a desired material to the geometry specified in step 306.

In step 310, the cut ribbons are lined up side-by-side and adjacent ribbons are joined together at the node walls. The ribbons may be pre-folded prior to being joined together. Alternatively, the ribbons may be pre-stressed along foldlines, joined together while flat prior to folding, and subsequently expanded to a desired shape. As used herein, "pre-stressed" means that ribbons are scored or pre-bent such that when an appropriate force is applied, the ribbons bend at the fold lines. By virtue of the geometry of the ribbons, a desired core geometry is formed. Alternatively, the ribbons need not be pre-stressed. Instead, when two ribbons are joined together, the portions of the ribbons which are joined together (i.e., the node-walls) are stronger and/or stiffer than the other portions of the ribbons. When a joined stack of ribbons is expanded, the non-joined portions bend while the joined portions stay substantially rigid. The expanded stack of ribbons will thus form the desired cell shapes. The process of lining up and joining the ribbons is explained in further detail below with respect to FIG. 10.

Figure 4:
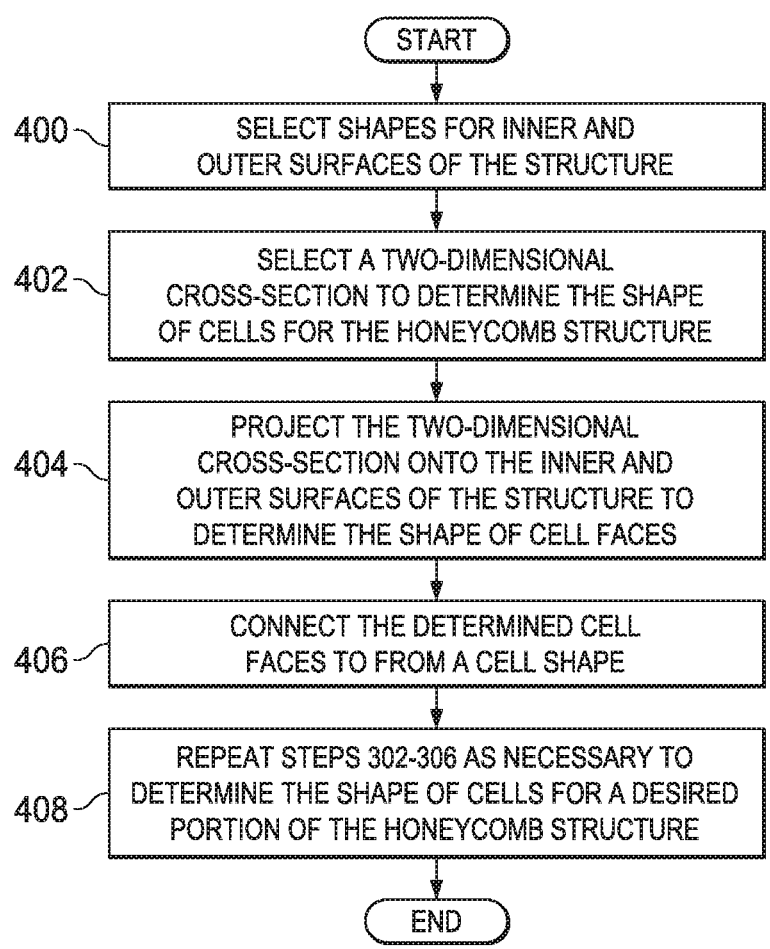
FIG. 4 is an illustration of the steps used in a first embodiment of a method for determining the shape of cells in a honeycomb core in accordance with an aspect of the disclosure.
Figure 5:
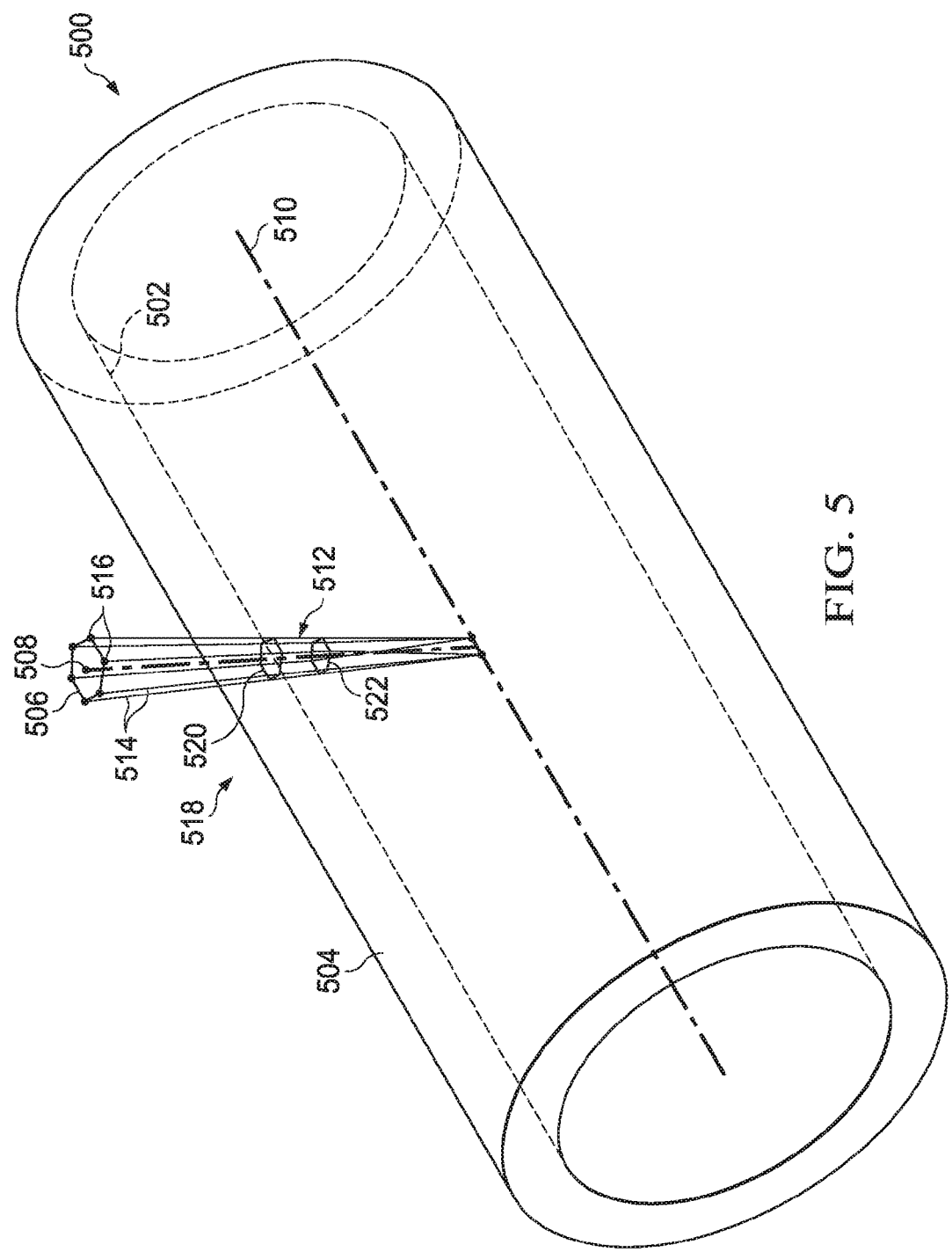
FIG. 5 is an illustration depicting determining the shape of cells in a honeycomb core in accordance with an aspect of the disclosure.
Figure 6:
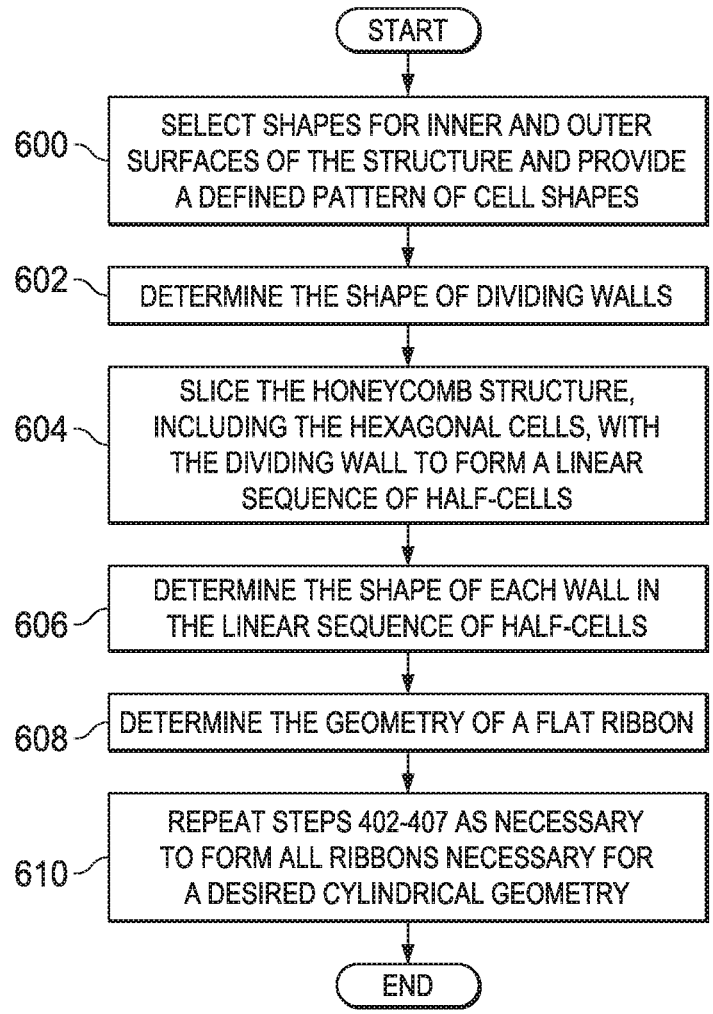
FIG. 6 is an illustration of the steps used in a first embodiment of a method for determining the shape of a ribbon used to make a honeycomb core in accordance with an aspect of the disclosure.

Referring now to FIGS. 4 and 5, an exemplary method for determining the shape of a pattern of cells which comprise the honeycomb core is disclosed. It should be understood that these methods make reference to geometrical shapes that can be represented as mathematical parameterizations or 3D CAD models, and that determination of the shapes disclosed herein can be done using basic mathematical principles or numerical methods, or CAD software.

FIG. 4 is an illustration of the steps for determining cell shapes, while FIG. 5 provides a depiction of an example cylindrical core geometry which illustrates an example of performing those steps. The desired cylindrical core geometry 500 is represented in this example as a hollow cylinder, with inner surface 502 and outer surface 504, and without the hexagonal cells depicted in FIG. 2. This core geometry represents the desired overall geometry that the honeycomb core will eventually have once all the ribbons are manufactured and joined together.

In step 400, a desired geometry of a honeycomb structure to be manufactured is selected and is provided in the form of an outer surface and an inner surface of the desired shape. This geometry can be represented with a CAD model or a mathematical description of the geometry. The hollow cylindrical core geometry 500 depicted in FIG. 5 is an example of one specific desired shape. The desired geometry may include any of a wide variety of hollow tubular shapes with curvature, thickness, or cross-section variation, as described above.

The core geometry 500 depicted in FIG. 5 has an inner surface 502 and an outer surface 504. The inner surface 502 and outer surface 504 are both cylindrical but have different radii. The inner surface 502 is embedded within the outer surface 504 to form a hollow cylindrical tube with a thickness defined by the difference between the two radii. Ribbons (not depicted in this figure) used to manufacture this shape will have a height approximately equal to this thickness. This example shape is a simple hollow regular cylinder with a straight axis and constant cross-section.

The shape of each of the cells is determined by selecting a "shape" for the cells in the form of a desired two-dimensional cross-section (for example, a hexagon) and taking a projection of the selected two-dimensional cross-section onto the inner and outer surfaces of the cylinder. As described above, cells are typically formed in the shape of a hexagon, but many other shapes may also be selected.

In step 402, a desired cross-section and distance from the cross-section to the axis of the cylinder are selected. This desired two-dimensional cross-section is oriented such that the cross-section is normal to the radius of the cylinder at the center of the cross-section.

If the axis 510 of the cylinder 500 has no curvature, then it is beneficial for at least two edges in the desired two-dimensional cross-section to be approximately parallel to each other, as this provides surfaces for adjacent ribbons to be adhered together. These two edges correspond to node walls in the cells. Similarly, if the axis 510 of the cylinder 500 has curvature, it is beneficial for two edges in the desired two-dimensional cross-section to be parallel to the radius of curvature of the axis, as this facilitates connection between adjacent ribbons oriented parallel to the radius of curvature of the axis of the cylinder. Again, these two edges correspond to node walls in the cells. The orientation of these two edges corresponds to a "ribbon orientation," which is a direction along the surface of the core in which the ribbons will lie. These two edges should be roughly aligned with the ribbon orientation, so that these edges in adjacent ribbons will be parallel to each other.

In the example shown in FIG. 5, a regular hexagon 506 is chosen as the desired two-dimensional cross-section 506, and the center 508 of the regular hexagon 506 is a desired distance X from the axis 510 of the cylinder 500.

In step 404, the two-dimensional cross-section is projected onto the outer and inner surfaces of the cylinder to form outer and inner faces of a cell, respectively. The projection may be done by drawing lines from the vertices of the cross-section to the axis of the cylinder. Preferably, the lines are drawn down to two points on the axis. To do this, the vertices of the cross-section are divided into two groups separated by a line perpendicular to axis 510 and passing through the center 508 of the cross-section 506. These two groups are on opposite sides of the center 508 of the cross-section. Lines from each vertex in the same group are drawn to the same point on the axis, as shown in FIG. 5. Preferably, one of these lines is perpendicular to the axis, while the other lines are not necessarily perpendicular. The perpendicular lines are drawn from vertices lying on a plane parallel to the ribbon orientation, and bisecting the cross-section.

In FIG. 5, lines 514 are drawn from the cross-section's vertices 516, to the axis 510 of the cylinder 500. This results in a wedge 518 running from the cross-section 506 to the axis 510 of the cylinder 500, and creates an inner projection 522 and an outer projection 520 on the inner surface 502 and outer surface 504, respectively.

In step 406, the vertices of the outer and inner faces are connected by edges to form the cell. The result is a cell shape and cell position for one cell of the honeycomb structure having thickness defined by the height of the walls of the cells. In FIG. 5, the cell 512 can be seen.

In step 408, cell shapes and positions are determined for a sufficient number of cells on the entire cylindrical honeycomb structure as desired. If the cylinder is sufficiently regular in shape (e.g., has a constant cross-section, constant axis curvature or zero axis curvature), a determined cell shape can be repeated through a portion of or through the entire cylinder. In that situation, cell shapes need to only be determined once, or a limited number of times. If the cylinder is not sufficiently regular, cell shapes may be determined for each point on the cylinder as necessary.

For example, with a regular cylinder having a straight axis and a constant circular cross-section, the shape of the cells will be the same at any point on the cylinder, since the geometry of the cylinder is completely uniform.

On the other hand, with a tapered cylinder (i.e., a truncated cone or a cone shaped cylinder), the cell shape may vary from one end of the tapered cylinder to the other. However, if the tapered cylinder has radial symmetry (e.g., it has a circular cross-section decreasing in radius from one end of the cylinder to the other), then a pattern of cells can be repeated around the axis of symmetry (i.e., identical patterns of cells exist for patterns of cells lying in the direction of the length of the tapered cylinder). Any of these types of symmetries are useful in determining to what extent ribbon geometries are identical throughout the cylinder (and therefore for choosing a desired ribbon orientation). Sequences of cell shapes which are identical to each other (even though all cells within in each sequence may not have the same shape) allow the creation of identically shaped ribbons, shaped to correspond to the identical sequences of cell shapes. The ribbon orientation is preferably chosen such that the ribbons are in the same direction as the identical sequences of cell shapes.

If the axis of the cylinder is curved, then the shapes of the cells vary in a direction traveling around the axis of the cylinder. If the axis of the cylinder has a constant curvature, then a form of symmetry exists (rotated around the axis of curvature), and patterns of cells in the direction of that symmetry exist which are identical (e.g., for a torus, or a portion of a torus, identical patterns of cells exist in a direction which is parallel to the cross-section of the cylinder). Additional such symmetries may be determined and are relevant for determining appropriate ribbon geometry which is discussed in more detail below.

FIGS. 6-9 depict a method of determining the geometry of ribbons comprising honeycomb core. This method begins with step 600, by providing a representation, in mathematical terms, or in computer model form, of a honeycomb core cylinder having a defined pattern of cell shapes. This representation may either be pre-defined or may be determined using the disclosure provided above. The overall geometry of the honeycomb core, as well as the geometry of the cells are analyzed to determine the geometry of ribbons for forming the honeycomb core. The example geometry provided in FIGS. 4B-4D is a regular cylinder (straight axis, constant circular cross-section) with roughly identical hexagonal cells, but the principles disclosed herein may be applied to a wide variety of cylindrical geometries.

The computer model representation or mathematical representation of the cells in the cylinder is analyzed and "divided" to form at least one linear sequence of half-cells. The term "divided" refers to a mathematical or computer operation in which a defined geometry is "cut" by a surface such as a plane, to determine the shape of a portion of that defined geometry. The direction of the divide approximately follows the direction of the ribbon orientation. More specifically, the representation of cells in the cylinder is divided by a surface which runs adjacent to node walls of adjacent cells in the direction of the ribbon orientation. This surface is shaped to follow the ribbon orientation and to be adjacent to the node walls of the cells. Further, each surface alternately divides in half, and then runs adjacent to, the cells in the honeycomb core. To obtain a linear sequence of half-cells, in step 602, at least two such surfaces are provided—these two surfaces "enclose" a sequence of half-cells having alternating orientations. These dividing surfaces are also referred to herein as "dividing walls."

In FIG. 7, two such dividing walls 701, 702 are shown. For clarity, FIG. 7 depicts only a small portion of cells in the cylinder 700. These walls run along the cylinder in a direction parallel to the axis 710 of the cylinder 700, and have a height 706 parallel to the radius 708 of the cylinder 500. Note that in this example, the ribbon orientation is in a direction parallel to the axis 710 of the cylinder, which is why the surfaces 701, 702 run in that direction.

In step 604, a linear sequence of half-cells is determined. This sequence is the result of performing a slicing operation (with, e.g., CAD software) on a model of the core with two adjacent dividing surfaces.

In FIG. 7, between two adjacent dividing walls 701 and 702, a linear sequence of half-cells 720 is shown. This linear sequence of half-cells 720 comprises a series of half-cells in alternating orientation. Each of the half-cells has cell walls.

In step 606, the shape of each wall in the linear sequence of half-cells is determined. In FIG. 7, the linear sequence of half-cells 720 possesses walls consisting of an alternating sequence of non-node walls 712 followed by node walls 714. The shape of all cell walls within the linear sequence of half cells should be determined. The shape of the linear sequence of half-cells is equivalent to the shape of a ribbon located at the ribbon location corresponding to the space between the two adjacent dividing walls 701 and 702, and folded to form the linear sequence of half cells. The determination of this ribbon shape can be done using CAD software, or for simple geometries, by applying mathematical principles. If the geometry of the ribbon is sufficiently regular (i.e., if the ribbon comprises identical half-cells), then only a small portion of the geometry of the entire ribbon must be calculated—this portion can be repeated for the entire length of the ribbon.

In step 608, the geometry of a flat ribbon is determined based on the wall shapes from step 606. This is described in more detail with respect to FIG. 9.

In step 610, steps 602 through 608 are repeated as needed for each type of ribbon required to form the desired cylindrical geometry. In FIG. 7, which depicts a regular cylinder, only one type of ribbon geometry exists. Therefore, the geometry of the ribbon already determined may be used throughout the cylinder, and steps 602 through 606 need not be repeated.

FIG. 8 depicts a close-up of a portion of a representation of one full half-cell 720 (on the right side of the drawing) and a portion of another half-cell (on the left side of the drawing) for a honeycomb structure having a regular cylindrical geometry (constant circular cross-section, uncurved axis). Each half-cell 720 depicted in this figure has two non-node walls 802 and one node wall 804. Vertices 806, 807, 808, 809, and edges 816, 817, 818, 819 of each of the walls 802, 804 are shown.

Node wall 804 has a top edge 816, a bottom edge 817, and two side edges 820. Non-node walls 802, have two side edges 820, a top edge 818 and a bottom edge 819. The top edge 816 and bottom edge 817 of the node-walls 804 are identical in length, as are the two side edges 820. The side edges 820 of the node walls 804 and non-node walls 802 are also identical in length and are at angle α with respect to each other. The angle α may be determined by extending a first line from vertex 809 perpendicular to the axis (not shown in this figure) and to a point on the axis, and extending a second line from vertex 813 to the same point on the axis. The angle between these two lines is equivalent to angle α.

Top edge 818 and bottom edge 819 of non-node walls 802 have a curvature that conforms to the geometry of the core cylinder 700. Because the top edge 818 traces the outer surface 703 of the cylinder, and the bottom edge 819 traces the inner surface 705 of the cylinder, and because the outer surface 703 has a larger radius than the inner surface 705, the top edge 818 is longer than the bottom edge 819.

Top edge 818 is shaped like an arc section of an ellipse formed by intersecting a plane with the outer surface 703 of the cylinder 700. The plane is parallel to the radius of the cylinder and contains the two vertices 807, 806 of top edge 818. Similarly, the bottom edge 819 is shaped as an arc section of an ellipse formed by intersecting a plane with the inner surface of the cylinder. The plane is parallel to the radius of the cylinder and contains the two vertices 809, 808 of bottom edge 819. If the cells are shaped approximately as a regular hexagon, these planes may be approximated as planes parallel to the radius and rotated by approximately 120 degrees with respect to the axis. In FIG. 8, these planes are not shown directly—only the intersection of the planes with the inner surface 705 and outer surface 703 of the cylinder respectively can be seen. These intersections are inner elliptical arc 822 and outer elliptical arc 824 which both follow the surface of the cylinder 700.

The calculations for determining the shape of edges 818-819 may be simplified by approximating edges 818-819 as arcs of a circle having a radius equivalent to the radius of the cylindrical surface on which the curved edges 818-819 lie. Further, the arc-length of the curved top or bottom edges may be approximated as $\Theta \cdot R$, where $\Theta$ is equal to the angle traversed by the curved edges 818-819. These approximations are fairly suitable if the size of the cells is much smaller than the radius of the cylinder, but becomes less accurate as the size of the cell becomes closer to the size of the cylinder.

Although the ribbons are described and depicted above as being identical for all locations throughout the cylindrical core geometry, varying core geometries may require different ribbon geometries. For manufacturing purposes, it is beneficial to have the smallest number of ribbon geometries.

For certain cylindrical shapes, only one ribbon geometry needs to be made. For others, a small number of ribbon geometries needs to be made. For the most complex cylindrical geometries, each ribbon would have to be customized for its location.

The presence of radial symmetry in a cylindrical geometry allows the use of identical ribbons running in a direction parallel to that symmetry. For example, a regular cylinder has radial symmetry around its axis, meaning that identical ribbons may be used if the ribbons run in the direction perpendicular to the axis of the cylinder. A tapered cylinder or a cylinder with a bulge in the middle similarly has radial symmetry around its axis, so identical ribbons may be used if the ribbons run in the directions established by lines of intersection between the surfaces of the tapered cylinder and planes containing the longitudinal axis of the cylinder. Further, with a torus, which is a "tube" which is wrapped around a major axis having a constant curvature, identical ribbons may be used if they are positioned such that they are parallel to the major radius of the torus, i.e., wrapped around the "tube" in a direction that is parallel to the major radius of the torus. In other words, identical patterns of cells exist for patterns of cells which are wrapped around the "tube" of the torus in a direction which is parallel to the major radius of the torus. This is because a torus is a structure with radial symmetry around a major axis—this major axis is the axis around which the "tube" of the torus is wrapped.

Although some cylinder geometries may not have any of these characteristics along their entire length, some cylinder geometries may nevertheless be broken down into sections, each of which have these characteristics (for example, multiple sections of a torus attached at their ends and rotated with respect to each other, or a torus section followed by a tapered straight cylindrical section). For such cylinders, each section may be made of identical ribbons.

Further, for any desired geometry which does not exactly match one of the "ideal" shapes having characteristics described above (such as symmetry), but almost matches such an ideal shape, an ideal shape may be manufactured using the above-described methodologies and then formed (e.g., the shape of the cylinder can be changed through the application of force) into the desired non-ideal shape. Although some forming would be required in this situation, the forming would be minimal in comparison with forming a shape from flat core material.

As shown in FIG. 9, once the shapes of all of the edges, and thus the walls of the half-cells, are determined, the shape of a flat, non-folded ribbon 900 can be determined. The ribbon geometry depicted in FIG. 7 is appropriate for forming a regular cylinder having a constant circular cross-section and a straight axis. The shape of the non-folded ribbon 900 is a flat shape that comprises a succession of sections separated by fold lines, each section having a shape equivalent to a wall of each half-cell in the linear sequence of half-cells 720.

The sections have the same order and shape as the walls in the linear sequence of half-cells 720. The shape of the edges of the sections is also the same as the shape of the corresponding edges of the walls. Thus, the first section 804 has the same shape as node wall 804, the second section 802 has the same shape as non-node wall 802, and so on. Further, the order of the sections in the flat ribbon 900 is the same as the order of the cell walls shown in FIGS. 7 and 8.

The flat ribbon 900 shown in FIG. 9 is curved along its length. This curvature is not necessarily a smooth curve, but is formed by the alternating straight-curved-straight edges of the rectangular sections 802 and trapezoidal sections 804, and also due to the fact that all of the short edges of the trapezoidal sections 804 are pointed in the same direction. In addition to the specific ribbon geometry shown in FIG. 9, curvature along the length of the flat ribbon may also be present with ribbon geometries cut to form other cylinder geometries. For every such cylindrical geometry, the curvature of curved flat ribbons that form the cylinder will be due to a combination of non-rectangular section shapes and curved section edges.

When the ribbon 900 shown in FIG. 9 is folded, the ribbon's edges become straight along the length of the ribbon as shown in FIG. 10. Some curvature exists in a direction corresponding to the curvature of the cylinder being formed. For ribbons used to form other cylinder geometries, such ribbons may not be straight along their lengths when folded. For example, for ribbons used to form a cylinder having a curved axis (and therefore an outer surface that is curved in the direction parallel to the direction of the axis), the corresponding folded ribbon may be curved along its length, to match the curved surface of the cylinder.

When the flat ribbon shape 900 is determined, a physical ribbon can be cut out of a base material such as metal or paper by conventional methods such as a stamp and press apparatus. This physical ribbon will then be folded to match the shape of the cells in the cylindrical core.

The edges 820 that separate the sections in the ribbon represent lines at which folds or bends will be made and are referred to herein as "fold lines." The flat ribbons are folded to form contoured ribbons with troughs and ridges that correspond to the linear sequence of half cells. The ribbons should be folded to angles such that the ribbons form the cells.

For the cell shape depicted in FIG. 4C, the direction of the fold is decided by which type of wall, node 804 or non-node 802, the fold lines 820 surround. If two fold lines 820 surround a node wall 804, then the folds made at both of those fold lines should be made in the same direction as each other. If two fold lines surround a non-node wall 802, then the folds made at both of these fold lines should be made in a direction opposite to each other. In this way, a repeating pattern of two folds in one direction followed by two folds in the opposite direction is made, and a series of semi-hexagonal half-cells is formed. The angle of the folds is determined by the shape of the half cells. For regular hexagons, the folds are made at approximately 120 degrees.

As shown in FIG. 10, the ribbons 900, once cut and folded, are joined together to form a linear series of hexagonal cells that comprise the cylindrical core. The ribbons should be joined together at their node walls 804. Ribbons are added in this manner until a number of ribbons required for the desired core geometry have been bound together.

If the ribbons were pre-folded, the cylindrical core is completed. Alternatively, if the ribbons were simply pre-stressed, then when it is desired to assemble the full structure, the ribbons may be pulled apart such that the structure is expanded and the ribbons are formed into the final desired structure. The expanded assembly of ribbons may be cured or otherwise solidified into the appropriate geometry. The teachings of this disclosure can be used to make a curved honeycomb core in a wide variety of geometries while requiring minimal forming.

Figure 11:
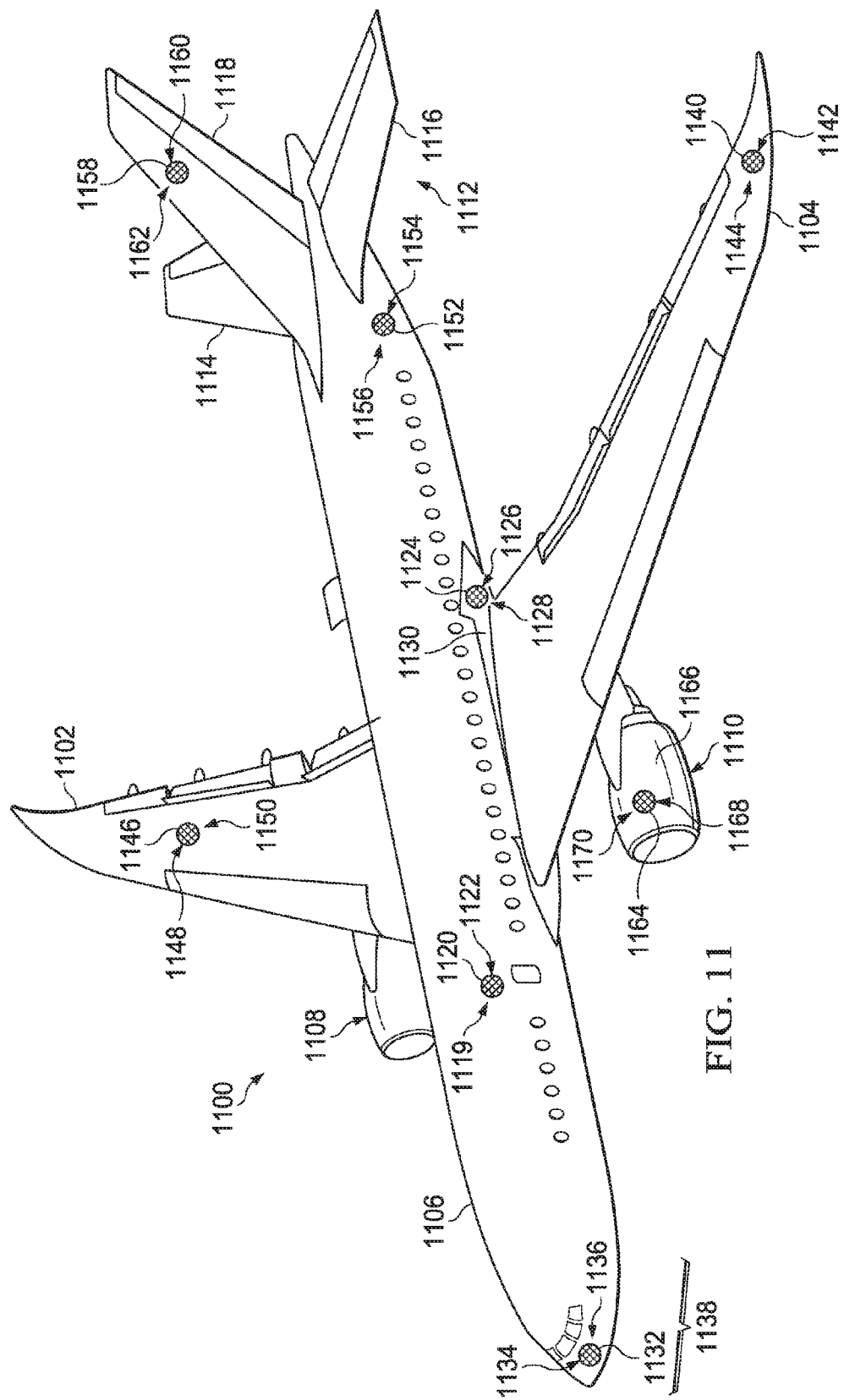
FIG. 11 is an illustration of an aircraft in accordance with an aspect of the disclosure.

With reference now to FIG. 11, an illustration of an aircraft is depicted in accordance with an illustrative embodiment. In this illustrative example, the aircraft 1100 has a wing 1102 and another wing 1104 attached to a fuselage 1106. The aircraft 1100 may include an engine 1108 attached to the wing 1102 and another engine 1110 attached to the other wing 1104. The fuselage 1106 may have a tail section 1112. A horizontal stabilizer 1114, another horizontal stabilizer 1116, and a vertical stabilizer 1118 may be attached to the tail section 1112 of the fuselage 1106.

The fuselage 1106 may be comprised of a composite structure having a cylindrical shape to form the cylindrical shape 1119 of the fuselage 1106. An exposed portion 1120 of the fuselage 1106 is seen with a skin (not shown) of this composite structure removed. A honeycomb structure 1122 is seen within this exposed portion 1120. The honeycomb structure 1122 is the core of the composite structure forming the fuselage 1106.

Additionally, an exposed portion 1124 of a fairing 1130 attached to the fuselage 1106 is seen with a skin (not shown) of this composite structure removed. A honeycomb structure 1126 is seen within this exposed portion 1124. The honeycomb structure 1126 is the core of the composite structure that forms the fairing 1130 and has a conical shape 1128.

An exposed portion 1132 of a nose section 1138 of the fuselage 1106 is seen with a skin (not shown) of this composite structure removed. A honeycomb structure 1134 is seen within this exposed portion 1132. The honeycomb structure 1134 is the core of the composite structure that forms the nose section 1138 and has a conical shape 1136.

Further, an exposed portion 1140 of the wing 1104 of the fuselage 1106 is seen with a skin (not shown) of this composite structure removed. A honeycomb structure 1142 is seen within this exposed portion 1140. The honeycomb structure 1142 is the core of the composite structure that forms the wing 1104 and has a curved shape 1144.

Further, an exposed portion 1146 of the wing 1102 of the fuselage 1106 is seen with a skin (not shown) of this composite structure removed. A honeycomb structure 1148 is seen within this exposed portion 1146. The honeycomb structure 1148 is the core of the composite structure that forms the wing 1102 and has a curved shape 1150.

Still further, an exposed portion 1152 of the tail section 1112 of the fuselage 1106 is seen with a skin (not shown) of this composite structure removed. A honeycomb structure 1154 is seen within this exposed portion 1152. The honeycomb structure 1154 is the core of the composite structure that forms the tail section 1112 and has a conical shape 1156.

An exposed portion 1158 of the vertical stabilizer 1118 of the fuselage 1106 is seen with a skin (not shown) of this composite structure removed. A honeycomb structure 1160 is seen within this exposed portion 1158. The honeycomb structure 1160 is the core of the composite structure that forms the vertical stabilizer 1118 and has a curved shape 1162.

In this illustrative example, honeycomb structures 1122, 1126, 1134, 1142, 1154, and 1160 may be example of implementations for the honeycomb structure 110 depicted in FIG. 1. As depicted, honeycomb structures may be used in a variety of different ways to form a variety of different structures having different types of curved shapes.

Figure 12:
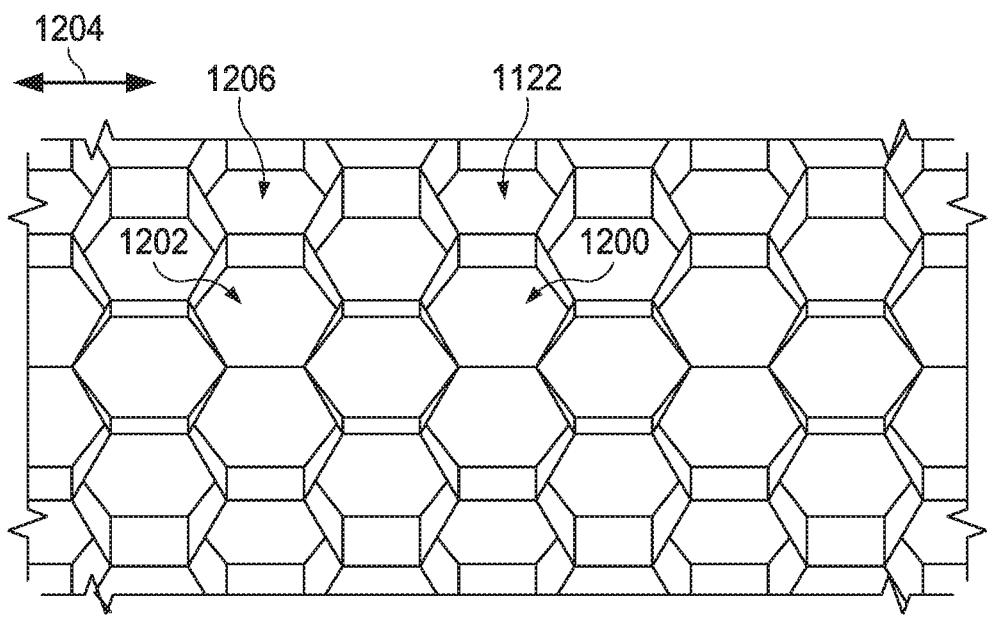
FIG. 12 is an illustration of a top view of a honeycomb structure in accordance with an aspect of the disclosure.

With reference now to FIG. 12, an illustration of a top view of the honeycomb structure 1122 from FIG. 11 is depicted in accordance with an illustrative embodiment. As depicted, the honeycomb structure 1122 is comprised of cells 1200 organized into cell rows 1202.

The cell rows 1202 comprising the cells 1200 may be an example of one implementation for the cell rows 113 comprising cells 112 in FIG. 1. As depicted, the cells rows 1202 are aligned parallel to an axis 1204. In this illustrative example, the honeycomb structure 1122 has a curved shape 1206. The curved shape 1206 may be curved about the axis 1204.

Figure 13:
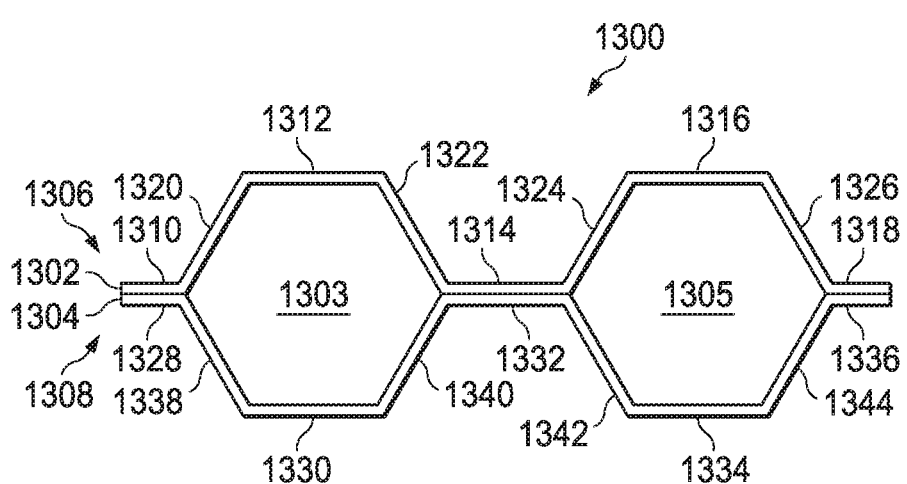
FIG. 13 is an illustration of a top view of a portion of a cell row in a plurality of cell rows in accordance with an illustrative embodiment.

Turning now to FIG. 13, an illustration of a top view of a portion of a cell row in the cell rows 1202 in FIG. 12 is depicted in accordance with an illustrative embodiment. In this illustrative example, a portion of a cell row 1300 is depicted. The cell row 1300 may be one of the cell rows 1202 in FIG. 12.

In this illustrative example, the cell row 1300 is formed by a first ribbon 1302 and a second ribbon 1304 joined together. The first ribbon 1302 and the second ribbon 1304 may be in a folded state 1306 and a corresponding folded state 1308, respectively. The first ribbon 1302 and the second ribbon 1304 may be joined together to form cells 1303 and 1305 in the cell row 1300.

As depicted, the first ribbon 1302 comprises node sections 1310, 1312, 1314, 1316, and 1318 and non-node sections 1320, 1322, 1324, and 1326. The second ribbon 1304 may comprise node sections 1328, 1330, 1332, 1334, and 1336 and non-node sections 1338, 1340, 1342, and 1344. The node sections 1310, 1314, and 1318 of the first ribbon 1302 and the node sections 1328, 1332, and 1336 of the second ribbon 1304 may be joined together using, for example, without limitation, welding, brazing, soldering, co-curing, co-bonding, adhesive bonding, and/or some other type of joining technique to form the portion of the cell row 1300 depicted in FIG. 13.

In this illustrative example, the cells 1303 and 1305 have hexagonal shapes. However, in other illustrative examples, the cells in a honeycomb structure may have other types of shapes. Illustrations of cell rows having cells with shapes other than hexagonal shapes are depicted in FIGS. 14-16 below.

Figure 14:
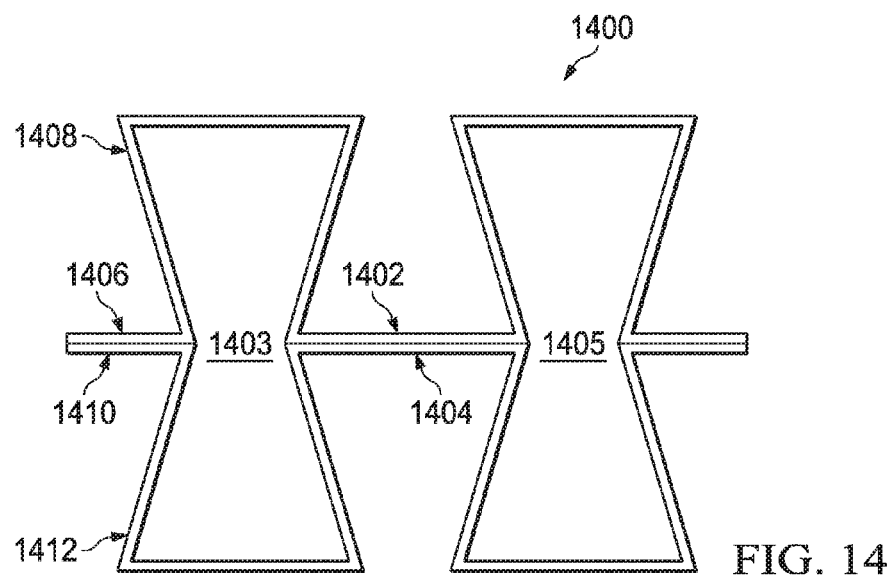
FIG. 14 is an illustration of a top view of a portion of a cell row in accordance with an aspect of the disclosure.

Turning now to FIG. 14, an illustration of a top view of a portion of a cell row is depicted in accordance with an illustrative embodiment. A portion of a cell row 1400 is depicted in FIG. 14. The cell row 1400 may include cells 1403 and 1405. The cells 1403 and 1405 may have hourglass type shapes in this illustrative example.

As depicted, the cell row 1400 may be formed by a first ribbon 1402 and a second ribbon 1404. The first ribbon 1402 may comprise node sections 1406 and non-node sections 1408. The node sections 1406 and the non-node sections 1408 may alternate along the first ribbon 1402. The second ribbon 1404 may comprise node sections 1410 and non-node sections 1412. The node sections 1410 and the non-node sections 1412 may alternate along the second ribbon 1404.

Figure 15:
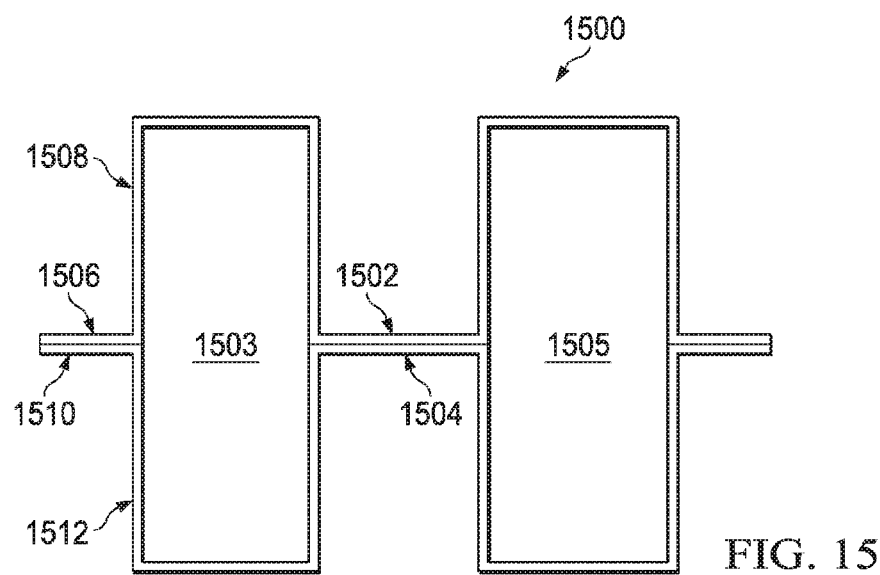
FIG. 15 is an illustration of a top view of a portion of a cell row in accordance with an aspect of the disclosure.
Figure 16:
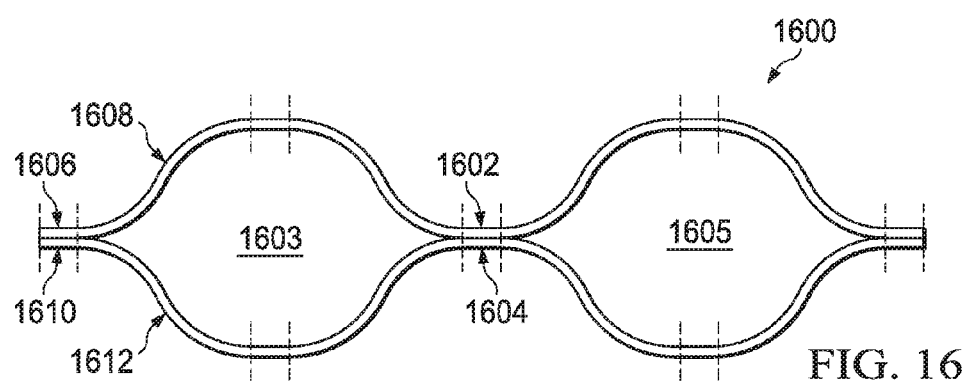
FIG. 16 is an illustration of a top view of a portion of a cell row in accordance with an aspect of the disclosure.

Turning now to FIG. 15, an illustration of a top view of a portion of a cell row is depicted in accordance with an illustrative embodiment. A portion of a cell row 1500 is depicted in FIG. 15. The cell row 1500 may include cells 1503 and 1505. These cells 1503 and 1505 may have rectangular shapes in this illustrative example.

As depicted, the cell row 1500 may be formed by a first ribbon 1502 and a second ribbon 1504. The first ribbon 1502 may comprise node sections 1506 and non-node sections 1508. The node sections 1506 and the non-node sections 1508 may alternate along the first ribbon 1502. The second ribbon 1504 may comprise node sections 1510 and non-node sections 1512. The node sections 1510 and the non-node sections 1512 may alternate along the second ribbon 15404.

Turning now to FIG. 16, an illustration of a top view of a portion of a cell row is depicted in accordance with an illustrative embodiment. A portion of a cell row 1600 is depicted in FIG. 16. The cell row 1600 may include cells 1603 and 1605. These cells 1603 and 1605 may have walnut-type shapes in this illustrative example.

As depicted, the cell row 1600 may be formed by a first ribbon 1602 and a second ribbon 1604. The first ribbon 1602 may comprise node sections 1606 and non-node sections 1608. The node sections 1606 and the non-node sections 1608 may alternate along the first ribbon 1602. The second ribbon 1604 may comprise node sections 1610 and non-node sections 1612. The node sections 1610 and the non-node sections 1612 may alternate along the second ribbon 1607.

The illustrations in FIG. 2-16 are not meant to imply physical or architectural limitations to the manner in which an illustrative embodiment may be implemented. Other components in addition to or in place of the ones illustrated may be used. Some components may be optional.

The different components shown in FIGS. 2-16 may be illustrative examples of how components shown in block form in FIG. 1 can be implemented as physical structures. Further, some of the components shown in FIGS. 2-16 may be combined with components illustrated in FIG. 1, used with components in FIG. 1, or both.

Figure 17:
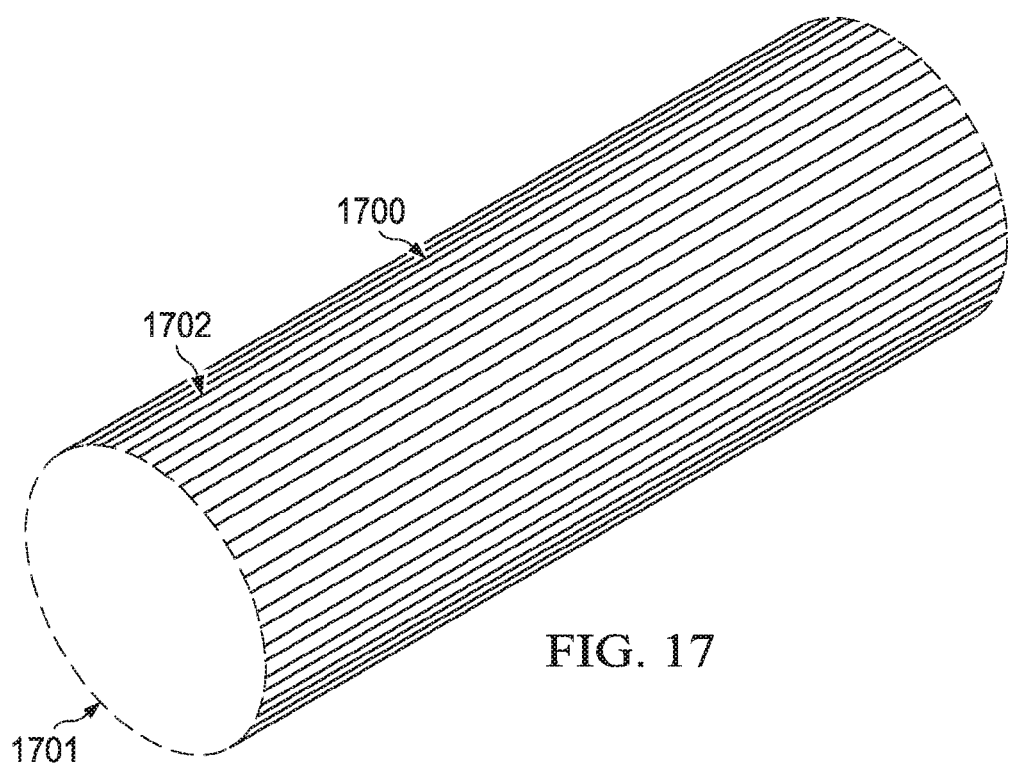
FIG. 17 is an illustration of a schematic representation of a honeycomb structure formed by multiple ribbons in accordance with an aspect of the disclosure.

With reference now to FIG. 17, an illustration of a schematic representation of an exemplary honeycomb structure formed by multiple discrete ribbons is depicted in accordance with an illustrative embodiment. In FIG. 17, a schematic representation of a honeycomb structure 1700 is depicted with the thickness of the honeycomb structure 1700 omitted for clarity. In particular, an outer surface shape 1701 of the honeycomb structure 1700 is represented in FIG. 17.

The honeycomb structure 1700 is formed by discrete ribbons 1702 that are schematically shown in representational form. The ribbons 1702 are aligned parallel to each other. Although ribbons 1702 may be joined together at node sections, these details are not shown in FIG. 17 to illustrate the discrete nature of ribbons 1702 more clearly.

Figure 18:
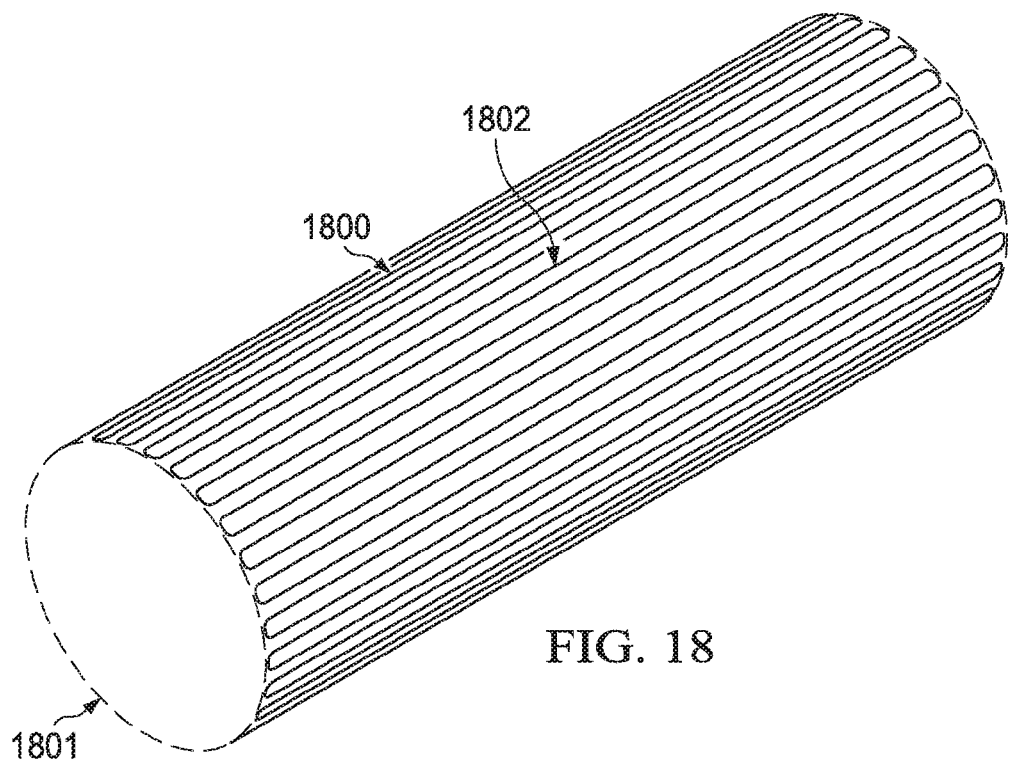
FIG. 18 is an illustration of a schematic representation of a honeycomb structure formed by a single ribbon in accordance with an aspect of the disclosure.

Turning now to FIG. 18, an illustration of a schematic representation of a honeycomb structure formed by a single continuous ribbon is depicted in accordance with an illustrative embodiment. In this illustrative example, a schematic representation of a honeycomb structure 1800 is depicted with the thickness of the honeycomb structure 1800 omitted for clarity. In particular, an outer surface shape 1801 of the honeycomb structure 1800 is represented in FIG. 18.

The honeycomb structure 1800 is formed by a single continuous ribbon 1802 that is schematically shown in representational form. This ribbon 1802 may wrap around (i.e., change direction or zig-zag) multiple times, such that different portions of the ribbon 1802 are aligned parallel to each other. Although these different portions of the ribbon 1802 may be joined together at node sections of the ribbon 1802 such details were omitted in FIG. 18 to illustrate the continuous nature of ribbon 1802 more clearly.

Those skilled in the art will appreciate that a hybrid discrete/continuous ribbon architecture may be utilized, wherein a plurality of continuous ribbons, each having at least one directional change or zig-zag therein, may be used to form an exemplary honeycomb structure.

Figure 19A:
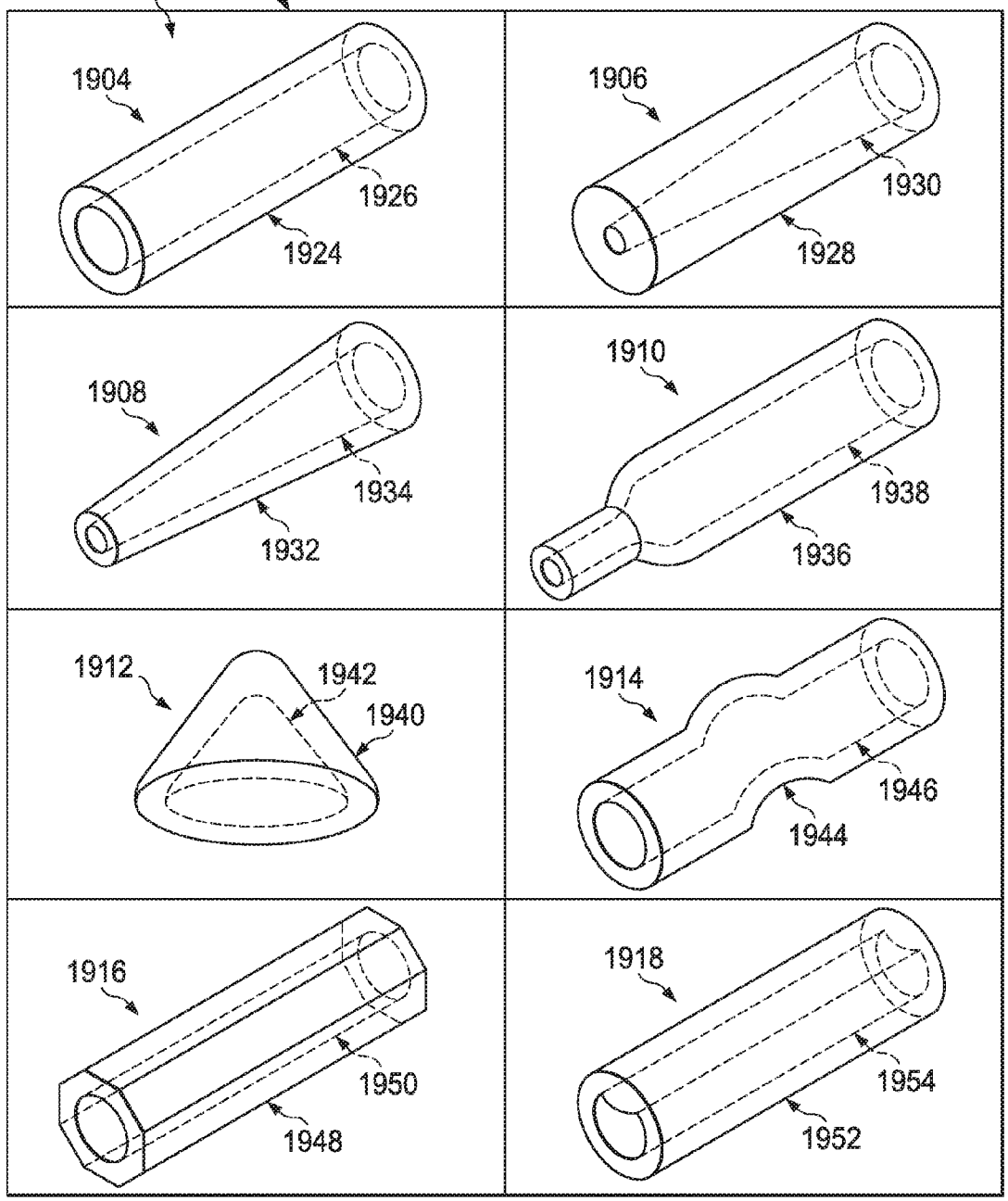

Turning now to FIGS. 19A and 19B, an illustration of a table of possible shapes for a honeycomb structure is depicted in accordance with an illustrative embodiment. In FIGS. 19A and 19B, a table 1900 depicting a set of shapes 1902 is depicted. Each shape in this set of shapes 1902 is a three-dimensional shape. In this manner, any one of this set of shapes 1902 may be used to implement the desired three-dimensional shape 114 described in FIG. 1.

The set of shapes 1902 includes a first shape 1904, a second shape 1906, a third shape 1908, a fourth shape 1910, a fifth shape 1912, a sixth shape 1914, a seventh shape 1916, an eighth shape 1918, a ninth shape 1920, a tenth shape 1922, an eleventh shape 1923, a twelfth shape 1925, a thirteenth shape 1927, a fourteenth shape 1929, a fifteenth shape 1931, and a sixteenth shape 1933. Each of these shapes may be formed by two surface shapes.

As depicted, the first shape 1904 is a cylindrical tube shape formed by a first surface shape 1924 and a second surface shape 1926. The second shape 1906 is a cylindrical tube shape formed by a first surface shape 1928 and a second surface shape 1930. The third shape 1908 is a cylindrical tube shape formed by a first surface shape 1932 and a second surface shape 1934.

The fourth shape 1910 is a bottle-type shape formed by a first surface shape 1936 and a second surface shape 1938. The fifth shape 1912 is a dome-topped shape formed by a first surface shape 1940 and a second surface shape 1942.

The sixth shape 1914 is an irregular cylindrical tube shape formed by a first surface shape 1944 and a second surface shape 1946. The seventh shape 1916 is an octagonal prism-type shape formed by a first surface shape 1948 and a second surface shape 1950. The eighth shape 1918 is an irregular cylindrical tube shape formed by a first surface shape 1952 and a second surface shape 1954. The ninth shape 1920 is another irregular cylindrical tube shape formed a by first surface shape 1956 and a second surface shape 1958. The tenth shape 1922 is a deformed cylindrical shape formed by a first surface shape 1960 and a second surface shape 1962.

The eleventh shape 1923 is a curved shape formed by a first surface shape 1964 and a second surface shape 1966. The twelfth shape 1925 is a curved shape formed by a first surface shape 1968 and a second surface shape 1970. The thirteenth shape 1927 is another curved shape formed by a first surface shape 1972 and a second surface shape 1974. The fourteenth shape 1929 is a shape comprising an irregular curved shape formed by a first surface shape 1976 and a second surface shape 1978.

The fifteenth shape 1931 is a shape comprising a curved portion and a flat portion formed by a first surface shape 1980 and a second surface shape 1982. The sixteenth shape 1933 is a shape comprising a curved portion and a flat portion formed by a first surface shape 1984 and a second surface shape 1986.

Each of the first surface shapes and each of the second surface shapes described above may be examples of implementations for the first surface shape 120 and the second surface shape 122, respectively, described in FIG. 1. In this manner, honeycomb structure 110 in FIG. 1 may be formed in a number of different ways. Those skilled in the art will appreciate that the above-described shapes are merely exemplary and the shape of the honeycomb structure may be any combination of the above shapes and/or other shapes not specifically described herein.

Each of the ribbons 126 described in FIG. 1 may be formed such that the first edge and second edge of the ribbon substantially conform to the first surface shape and the second surface shape, respectively, of the desired three-dimensional shape selected from the set of shapes 1902 when the ribbon is in a folded state. Depending on the desired three-dimensional shape, each of the ribbons 126 may have a same or different shape when folded compared to the other ribbons.

Figure 20:
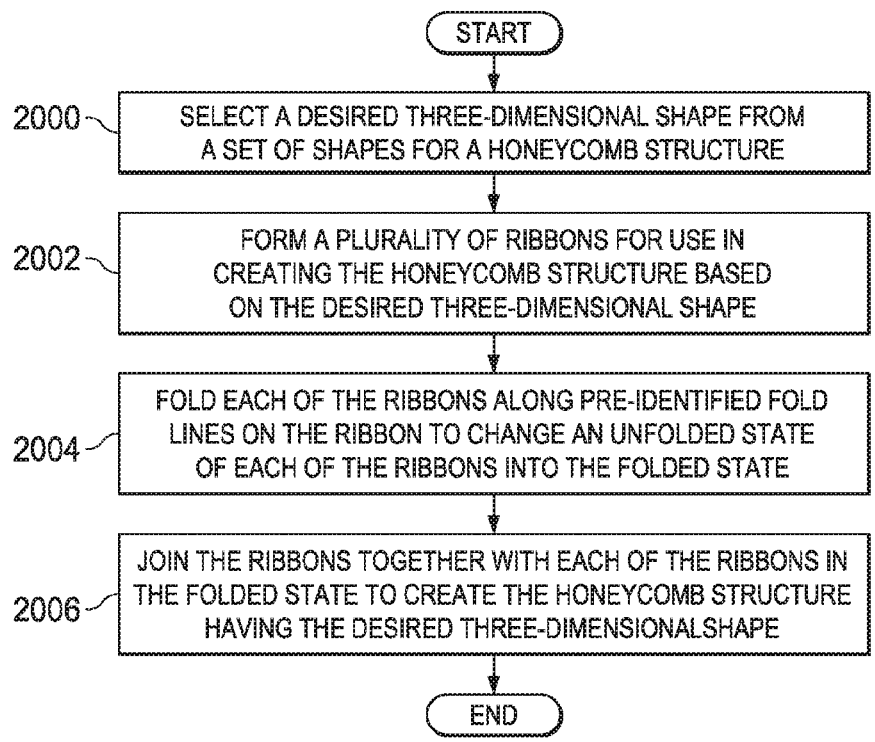
FIG. 20 is an illustration of a process for forming a honeycomb structure in the form of a flowchart in accordance with an aspect of the disclosure.

Turning now to FIG. 20, an illustration of a process for forming a honeycomb structure in the form of a flowchart is depicted in accordance with an illustrative embodiment. The process illustrated in FIG. 20 may be implemented to form, for example, without limitation the honeycomb structure 110 in FIG. 1.

The process may begin by selecting a desired three-dimensional shape from a set of shapes for the honeycomb structure (operation 2000). The desired three-dimensional shape may comprise a first surface shape and a second surface shape.

The process then forms a plurality of ribbons for use in creating the honeycomb structure based on the desired three-dimensional shape (operation 2002). Thereafter, each of the ribbons is folded along pre-identified fold lines on each of the ribbons to change an unfolded state of each of the ribbons into the folded state (operation 2004).

Next, the ribbons are joined together with each of the ribbons in the folded state to form the honeycomb structure having the desired three-dimensional shape (operation 2006), with the process terminating thereafter. In particular, at least one portion of a first surface of the honeycomb structure may not be parallel to at least one portion of a second surface of the honeycomb structure.

Figure 21:
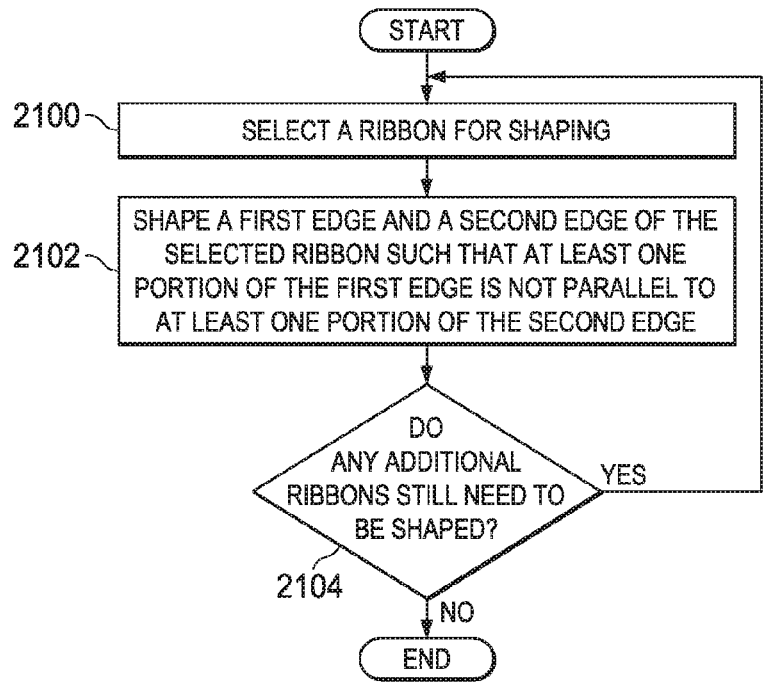
FIG. 21 is an illustration of a process for forming ribbons for use in creating a honeycomb structure in the form of a flowchart in accordance with an aspect of the disclosure.

Turning now to FIG. 21, an illustration of a process for forming ribbons for use in creating a honeycomb structure in the form of a flowchart is depicted in accordance with an illustrative embodiment. The process illustrated in FIG. 21 may be used to implement operation 2002 in FIG. 20.

The process begins by selecting a ribbon for shaping (operation 2100). A first edge and second edge of the selected ribbon are then shaped such that at least one portion of the first edge is not parallel to at least one portion of the second edge (operation 2102). Thereafter, the process determines whether any additional ribbons still need to be shaped (operation 2104). If one or more additional ribbons still need to be shaped, the process returns to operation 2100 as described above. Otherwise, the process terminates.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the different illustrative embodiments provide a method and apparatus for forming a honeycomb structure having a first surface and a second surface in which at least one portion of the first surface is not parallel to at least one portion of the second surface. In one illustrative embodiment, a honeycomb structure comprises a first surface, a second surface, at least one ribbon, and a plurality of cells. The at least one ribbon comprises a first edge and a second edge. The first edge forms at least a portion of the first surface when the at least one ribbon is in a folded state. The second edge forms at least a portion of the second surface when the at least one ribbon is in the folded state. At least one portion of the first edge is not parallel to at least one portion of the second edge when the at least one ribbon is in an unfolded state. The plurality of cells is at least partially formed by the at least one ribbon.

While the disclosure has been described with reference to various embodiments, it will be understood by those skilled in the art that various changes may be made and equivalents may be substituted for elements thereof without departing from the scope of the disclosure. In addition, many modifications may be made to adapt a particular situation to the teachings of the disclosure without departing from the essential scope thereof. Therefore it is intended that the disclosure not be limited to the particular embodiment disclosed herein contemplated for carrying out the methods of this disclosure, but that the disclosure will include all embodiments falling within the scope of the appended claims.

What is claimed is:

1. A method for forming a non-planar honeycomb structure, the method comprising:
   folding at least one ribbon along side edges of the at least one ribbon to form cells of the non-planar honeycomb structure, the side edges partially defining sections of the at least one ribbon, wherein at least one of the side edges of the at least one ribbon is not substantially parallel to another one of the side edges of the at least one ribbon, the sections comprising first section edges and second section edges;
   forming at least a portion of a first surface of the non-planar honeycomb structure from the first section edges, wherein the first section edges of at least two of the sections adjacent to each other are not collinear when the at least one ribbon is unfolded flat; and
   forming at least a portion of a second surface of the non-planar honeycomb structure from the second section edges, wherein the second section edges of the at least two of the sections adjacent to each other are not collinear when the at least one ribbon is unfolded flat.

2. The method of claim 1, wherein the first surface of the non-planar honeycomb structure has a first radius of curvature and at the second surface of the non-planar honeycomb structure has a second radius of curvature and wherein the first radius of curvature and the second radius of curvature are different.

3. The method of claim 1, wherein the at least one ribbon further comprises:
   a plurality of node sections; and
   a plurality of non-node sections, wherein the plurality of node sections and the plurality of non-node sections are configured to alternate along the at least one ribbon such that no one node section in the plurality of node sections is adjacent to another node section in the plurality of node sections and no one non-node section in the plurality of non-node sections is adjacent to another non-node section in the plurality of non-node sections.

4. The method of claim 3, wherein forming the cells further comprises:
   alternating rectangular node sections and non-node sections, wherein at least a portion of at least one of the first section edges and the second section edges is curved when the at least one ribbon is in an unfolded state.

5. The method of claim 1, wherein each of the cells of the non-planar honeycomb structure is not deformed.

6. The method of claim 5, wherein forming the cells further comprises:
   alternating rectangular node sections and acute trapezoidal non-node sections to form the sections.

7. The method of claim 6, wherein forming the cells further comprises:
   adhering the rectangular node sections of the at least one ribbon to other rectangular node sections, but not adhering the acute trapezoidal non-node sections.

8. The method of claim 7, wherein forming the cells further comprises:
   adhering the rectangular node sections of the at least one ribbon to the other rectangular node sections to form the cells, but not adhering the acute trapezoidal non-node sections.

9. The method of claim 8, wherein adhering the rectangular node sections further comprises:
   adhering the rectangular node sections by a joining technique selected from the group consisting of welding, brazing, gluing, curing, and combinations thereof.

10. The method of claim 1, wherein the cells formed by folding the at least one ribbon along the side edges comprises an array of hollow cells having substantially vertical walls.

11. The method of claim 10, further comprising;
    attaching a first skin to the first surface; and
    attaching a second skin to the second surface.

12. The method of claim 11, wherein the substantially vertical walls are substantially perpendicular to the first skin and the second skin.

13. The method of claim 1, wherein each of the cells has a shape selected from the group consisting of a hexagonal shape, a rectangular shape, a square shape, an octagonal shape, a pentagonal shape, a triangular shape, a circular shape, an elliptical shape, and combinations thereof.

14. The method of claim 1, wherein
    the non-planar honeycomb structure has a longitudinal axis, and
    wherein each of the cells is oriented parallel to the longitudinal axis of the non-planar honeycomb structure, perpendicular to the longitudinal axis of the non-planar honeycomb structure, or oblique to the longitudinal axis of the non-planar honeycomb structure.

15. The method of claim 1, wherein the non-planar honeycomb structure has a desired three-dimensional shape, wherein the desired three-dimensional shape is selected from the group consisting of a cylindrical tube shape, a radome shape, a semi-spherical shape, a prism-type shape, a horseshoe-type shape, a donut-type shape, a curved shape, a conical shape, and combinations thereof.

16. The method of claim 1, wherein the at least one ribbon further comprises a plurality of ribbons.

17. The method of claim 16, further comprising:
    assigning each of the plurality of ribbons an assigned position within an ordered sequence for the plurality of ribbons.

18. The method of claim 17, further comprising:
    assembling the plurality of ribbons according to the ordered sequence to form a desired three-dimensional shape for the non-planar honeycomb structure.

* * * * *